(12) United States Patent
Baker

(10) Patent No.: US 12,006,712 B2
(45) Date of Patent: Jun. 11, 2024

(54) GARAGES RETROFITTED FOR ALTERNATIVE USES AND RELATED TECHNOLOGY

(71) Applicant: Theodore W. Baker, Orlando, FL (US)

(72) Inventor: Theodore W. Baker, Orlando, FL (US)

( * ) Notice: Subject to any disclaimer, the term of this patent is extended or adjusted under 35 U.S.C. 154(b) by 66 days.

(21) Appl. No.: 17/551,325

(22) Filed: Dec. 15, 2021

(65) Prior Publication Data
US 2022/0213706 A1 Jul. 7, 2022

Related U.S. Application Data

(63) Continuation of application No. 16/882,519, filed on May 24, 2020, now abandoned, which is a continuation of application No. 16/018,620, filed on Jun. 26, 2018, now Pat. No. 10,662,662, which is a continuation of application No. 15/675,745, filed on Aug. 13, 2017, now Pat. No. 10,036,172, and a continuation-in-part of application No. 15/456,523, filed on Mar. 11, 2017, now Pat. No. 10,043,227, and a continuation-in-part of application No. 15/390,731, filed on Dec. 27, 2016, now abandoned, and a
(Continued)

(51) Int. Cl.
| | |
|---|---|
| *E04H 1/12* | (2006.01) |
| *A47K 4/00* | (2006.01) |
| *E04B 1/343* | (2006.01) |
| *E04B 1/348* | (2006.01) |
| *E04H 3/02* | (2006.01) |
| *G06Q 10/02* | (2012.01) |
| *G06Q 50/12* | (2012.01) |

(52) U.S. Cl.
CPC ............ *E04H 1/1266* (2013.01); *A47K 4/00* (2013.01); *E04H 3/02* (2013.01); *G06Q 10/02* (2013.01); *G06Q 50/12* (2013.01); *E04B 1/34315* (2013.01); *E04B 1/34869* (2013.01); *E04H 1/1216* (2013.01)

(58) Field of Classification Search
CPC ....... E04H 1/1266; E04H 3/02; E04H 1/1216; A47K 4/00; G06Q 10/02; G06Q 50/12; E04B 1/34315; E04B 1/34869
See application file for complete search history.

(56) References Cited

U.S. PATENT DOCUMENTS

| | | | |
|---|---|---|---|
| 5,265,384 A * | 11/1993 | Menke | E04H 3/08 52/79.8 |
| 10,662,662 B2 * | 5/2020 | Baker | G06Q 10/02 |

(Continued)

*Primary Examiner* — Andrew J Triggs

(57) ABSTRACT

A real estate unit in accordance with a particular embodiment of the present technology includes an interior region of a retrofitted garage, a reusable bathroom operably associated with the interior region, and a fenestrated barrier also operably associated with the interior region. The reusable bathroom can be removably disposed within or outside the interior region. The fenestrated barrier can be stationarily and removably disposed between the interior region and an outdoor area. The retrofitted garage can include a wall between the interior region and the outdoor area. The wall can include an opening having a width within a range from 2 meters to 7 meters. A path permitting a user of the real estate unit to move between the interior region and the outdoor area can extend through the opening and through the fenestrated barrier.

19 Claims, 24 Drawing Sheets

Related U.S. Application Data continuation-in-part of application No. 15/263,527, filed on Sep. 13, 2016, now Pat. No. 10,011,982, and a continuation-in-part of application No. 15/140,785, filed on Apr. 28, 2016, now Pat. No. 10,529,038.

(60) Provisional application No. 62/375,903, filed on Aug. 17, 2016, provisional application No. 62/310,045, filed on Mar. 18, 2016, provisional application No. 62/273,700, filed on Dec. 31, 2015, provisional application No. 62/222,750, filed on Sep. 23, 2015, provisional application No. 62/154,209, filed on Apr. 29, 2015.

(56) References Cited

U.S. PATENT DOCUMENTS

| | | | | |
|---|---|---|---|---|
| 2008/0115416 | A1* | 5/2008 | Clark | E06B 3/485 |
| | | | | 49/142 |
| 2009/0026196 | A1* | 1/2009 | Leedekerken | B65D 85/68 |
| | | | | 206/335 |
| 2015/0354200 | A1* | 12/2015 | Leclerc | A47B 77/08 |
| | | | | 52/745.02 |
| 2018/0291615 | A1* | 10/2018 | Baker | E04B 1/34869 |
| 2020/0362579 | A1* | 11/2020 | Baker | E04H 3/02 |
| 2022/0213706 | A1* | 7/2022 | Baker | G06Q 50/12 |

\* cited by examiner

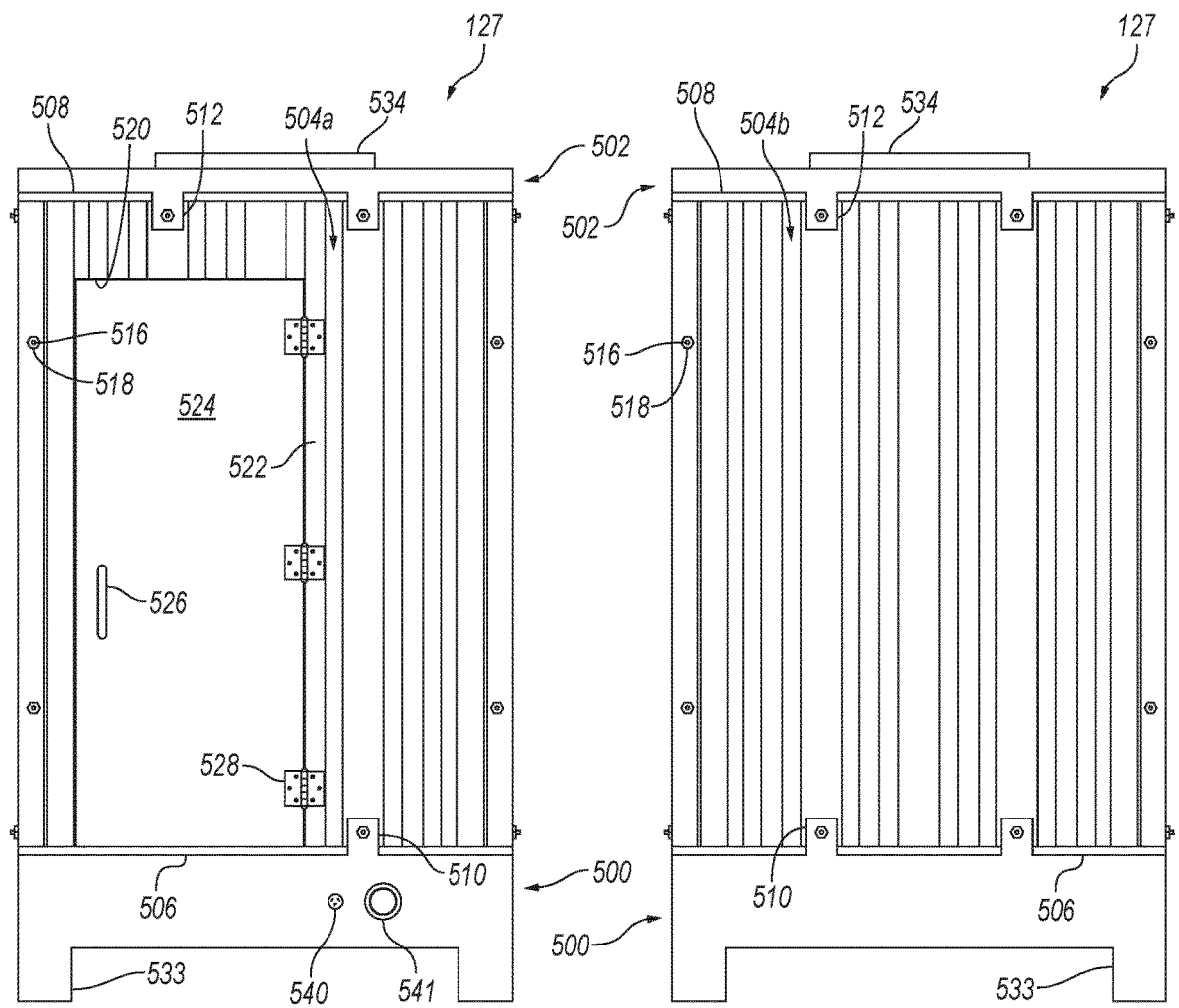
*Fig. 23*  *Fig. 24*

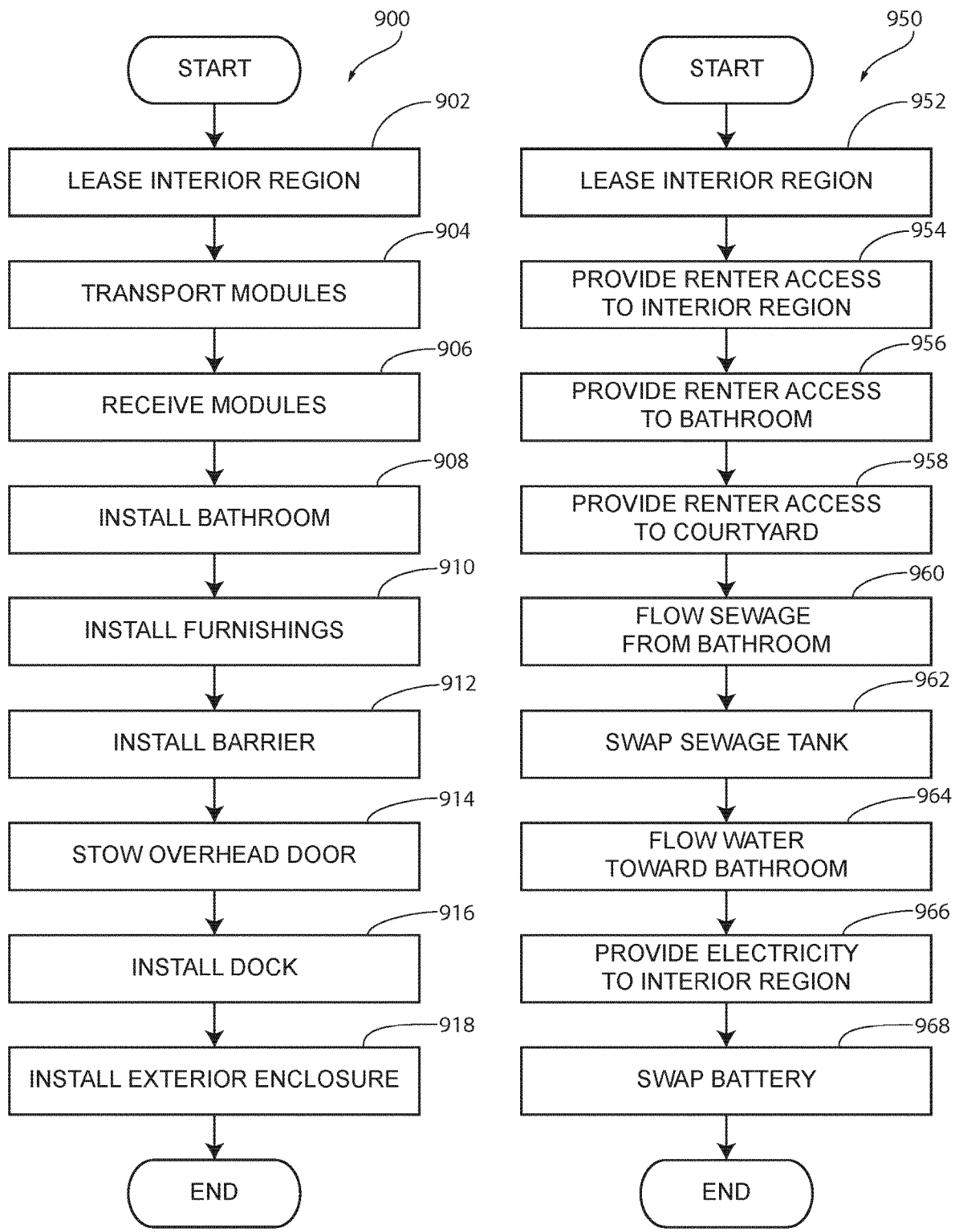

GARAGES RETROFITTED FOR ALTERNATIVE USES AND RELATED TECHNOLOGY

CROSS-REFERENCE TO RELATED APPLICATION AND LIST OF OTHER APPLICATIONS INCORPORATED BY REFERENCE

This is a continuation of U.S. patent application Ser. No. 16/882,519, filed May 24, 2020, entitled "Garages Retrofitted for Alternative Uses and Related Technology," which is a continuation of U.S. patent application Ser. No. 16/018,620, filed Jun. 26, 2018, entitled "Retrofitted Real Estate and Related Technology." The foregoing applications are incorporated herein by reference in their entirety.

The following applications are also incorporated herein by reference in their entireties:

U.S. Patent Application No. 62/154,209, filed Apr. 29, 2015, entitled "Dynamic Interstitial Hotels and Related Technology,"

U.S. Patent Application No. 62/222,750, filed Sep. 23, 2015, entitled "School Spaces Retrofitted for Alternative Uses and Related Technology,"

U.S. Patent Application No. 62/273,700, filed Dec. 31, 2015, entitled "Garages Retrofitted for Alternative Uses and Related Technology,"

U.S. Patent Application No. 62/310,045, filed Mar. 18, 2016, entitled "Commercial Loading, Storage, Parking, and Vehicle-Servicing Spaces Retrofitted for Alternative Uses and Related Technology,"

U.S. Patent Application No. 62/375,903, filed Aug. 17, 2016, entitled "Commercial Storefront Spaces Retrofitted for Alternative Uses and Related Technology,"

U.S. Patent Application No. 62/689,984, filed Jun. 26, 2018, entitled "Modular Walls and Related Technology,"

U.S. patent application Ser. No. 15/140,785, filed Apr. 28, 2016, entitled "Dynamic Interstitial Hotels and Related Technology,"

U.S. patent application Ser. No. 15/263,527, filed Sep. 13, 2016, entitled "School Spaces Retrofitted for Alternative Uses and Related Technology,"

U.S. patent application Ser. No. 15/390,731, filed Dec. 27, 2016, entitled "Garages Retrofitted for Alternative Uses and Related Technology,"

U.S. patent application Ser. No. 15/456,523, filed Mar. 11, 2017, entitled "Commercial Loading, Storage, Parking, and Vehicle-Servicing Spaces Retrofitted for Alternative Uses and Related Technology."

U.S. patent application Ser. No. 15/675,745, filed Aug. 13, 2017, entitled "Commercial Storefront Spaces Retrofitted for Alternative Uses and Related Technology," and U.S. patent application Ser. No. 16/440,914, filed Jun. 13, 2019, entitled "Modular Walls and Related Technology."

To the extent the foregoing applications or any other material incorporated herein by reference conflicts with the present disclosure, the present disclosure controls.

TECHNICAL FIELD

This disclosure is related to real estate technology.

BACKGROUND

Building conventional real estate is capital intensive and slow. Accordingly, short-term changes in demand for real estate do not conventionally lead to rapid changes in real estate capacity. For example, markets with high demand for real estate often suffer from insufficient real estate capacity for years before new conventional real estate projects are approved and completed. Peer-to-peer real estate networks mitigate this problem to some degree, but have other significant disadvantages, such as high transaction costs, inconsistent quality, and regulatory issues. Independent of these problems, valuable real estate in major urban areas is often unutilized or under utilized. These and other aspects of conventional real estate represent inefficiencies with the potential to be at least partially addressed by innovation.

BRIEF DESCRIPTION OF THE DRAWINGS

Many aspects of the present technology can be better understood with reference to the following drawings. The relative dimensions in the drawings may be to scale with respect to some embodiments of the present technology. With respect to other embodiments, the drawings may not be to scale. For clarity of illustration, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 21, 22, 23 and 24 are, respectively, a first side profile view, an opposite second side profile view, a first end profile view, and an opposite second end profile view of a bathroom of the real estate unit shown in FIG. 4.

FIG. 37 is a block diagram illustrating a method for retrofitting a garage to form at least a portion of a real estate unit in accordance with an embodiment of the present technology.

FIG. 38 is a block diagram illustrating a method for operating a real estate unit in accordance with an embodiment of the present technology.

DETAILED DESCRIPTION

Figure 1:
FIG. 1 is a front profile view of a single-family house including an attached garage.

Disclosed herein are examples of real estate units including interior regions of retrofitted garages (alternatively known as carports) and related technology. In a particular embodiment of the present technology, a real estate unit includes an interior region of a retrofitted garage, a reusable bathroom removably disposed within the interior region, and a reusable fenestrated barrier stationarily and removably disposed between the interior region and an outdoor area. The bathroom, barrier, and/or other suitable components of the real estate unit can be configured for low-cost deployment, removal, and redeployment. Use of these components can allow revenue from operating the real estate unit to exceed costs associated within transitioning the garage from its purpose-built use (e.g., storing one or more parked cars) to an alternative use (e.g., lodging, residential, office, and/or assembly use) even if the real estate unit is only operated for a short period of time. Thus, an operator of a network of real estate units may be able to lease a garage short-term (e.g., monthly) from an owner of the garage and retrofit the garage for provision of rentable space to third parties with little or no risk of incurring significant economic loss. Even if the owner terminates the lease after a short period of time or if demand for the newly created real estate unit is lower than expected, most of the capital associated with retrofitting the garage can be recoverable. Furthermore, capital embodied in the components can be readily relocatable in response to long-term and short-term (e.g., seasonal) changes in demand.

Among various types of real estate, garages are particularly well suited to be at least substantially reversibly retrofitted to accommodate alternative uses. For example, garages tend to be well sized for use as individual lodging, residential, office, and/or assembly units. Garages also tend to be remarkably consistent and, therefore, potentially compatible with a standard set of reusable retrofitting components. As another example, garages tend to be unfurnished or sparsely finished in their purpose-built use, which can facilitate retrofitting. As yet another example, garages typically have large openings at ground level. These openings can be well suited for retrofitting to become sources of natural light and/or points of direct exterior access. As yet another example, garages typically have at least one exterior wall well suited for accommodating retrofitted utility connections between indoor and outdoor components. Garages compatible with embodiments of the present technology can have other desirable attributes in addition to or instead of the forgoing attributes. Furthermore, embodiments of the present technology can be implemented in other types of real estate, such as other garage-like types of real estate. Examples of other garage-like types of real estate include storage spaces (e.g., drive-up mini-storage units) and loading spaces (e.g., loading docks).

Specific details of several embodiments of the present technology are disclosed herein with reference to FIGS. 1-38. It should be noted, in general, that other embodiments in addition to those disclosed herein are within the scope of the present technology. For example, embodiments of the present technology can have different configurations, components, and/or operations than those disclosed herein. Moreover, a person of ordinary skill in the art will understand that embodiments of the present technology can have configurations, components, and/or operations in addition to those disclosed herein and that these and other embodiments can be without configurations, components, and/or operations disclosed herein without deviating from the present technology.

Figure 2:
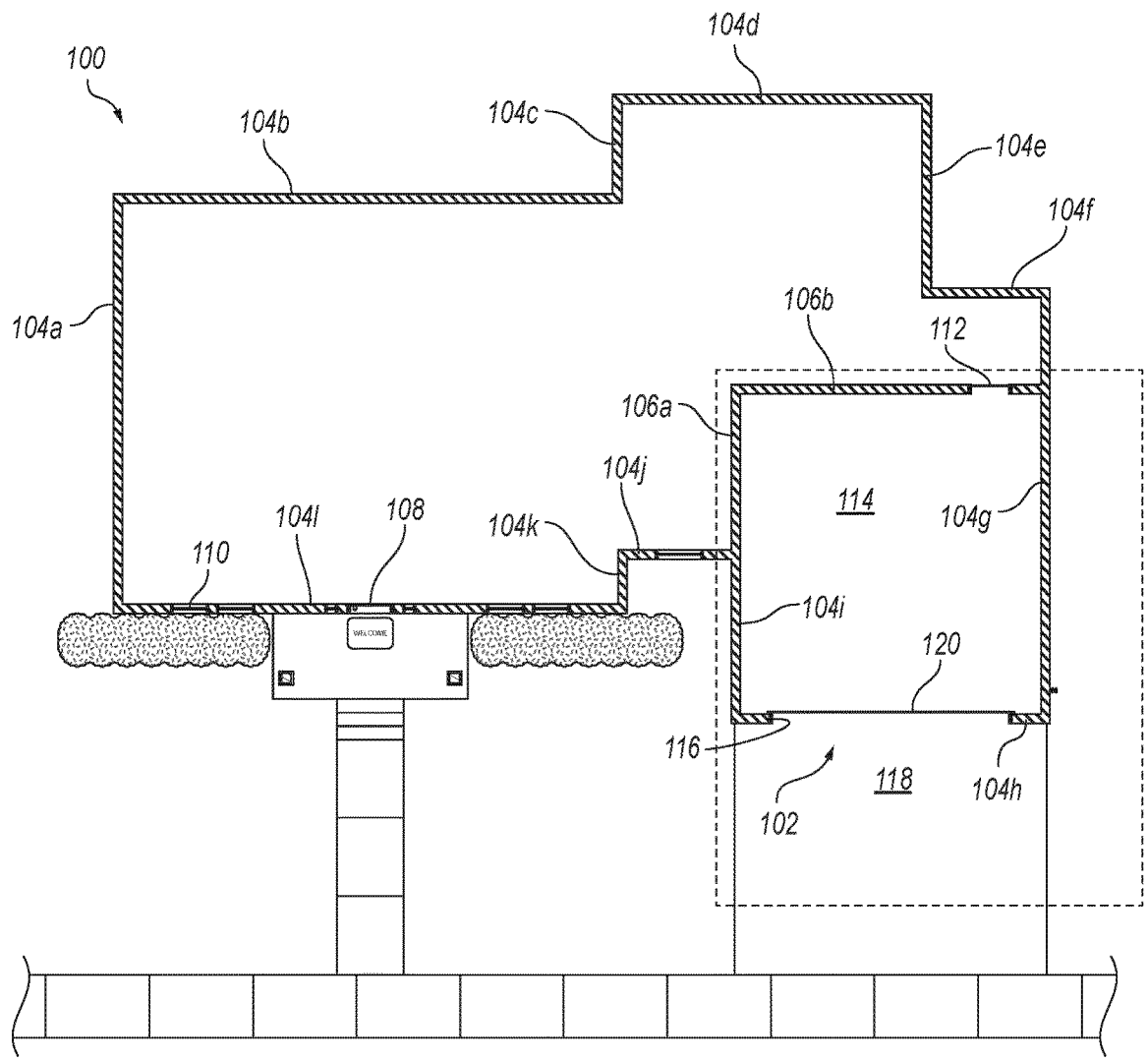
FIG. 2 is a cross-sectional top plan view of the single-family house shown in FIG. 1 taken along the line A-A in FIG. 1 with the garage in a first state.

FIG. 1 is a front profile view of a house 100 including a garage 102. FIG. 2 is a cross-sectional top plan view of the house 100 taken along the line A-A in FIG. 1 with the garage 102 in a first state. The first state can be a garage-use, original, unretrofitted, pre-retrofit, or similar state. With reference to FIGS. 1 and 2 together, the house 100 can include permanent exterior walls 104 (individually identified as exterior walls 104a-104l), permanent interior walls 106 (individually identified as interior walls 106a, 106b), a front doorway 108, windows 110, and an interior doorway 112. The exterior walls 104g-104i and interior walls 106a, 106b can define an interior region 114 of the garage 102. The interior doorway 112 can extend between the interior region 114 and an adjacent interior region of the house 100. For simplicity of illustration, interior walls and doorways (other than those associated with the garage 102), windows at the sides and back of the house 100, and interior furnishings of the house 100 are not shown. The exterior wall 104h can have an opening 116 between the interior region 114 and the outdoor area 118. The outdoor area 118 can be a driveway and/or parking area. Furthermore, the opening 116 can be sized to permit passage of a car between the interior region 114 and the outdoor area 118. For example, the opening 116 can have a width within a range from 2 meters to 7 meters (e.g., from 4 meters to 6 meters). The house 100 can further include an overhead door 120 movably disposed at the opening 116.

Figure 3:
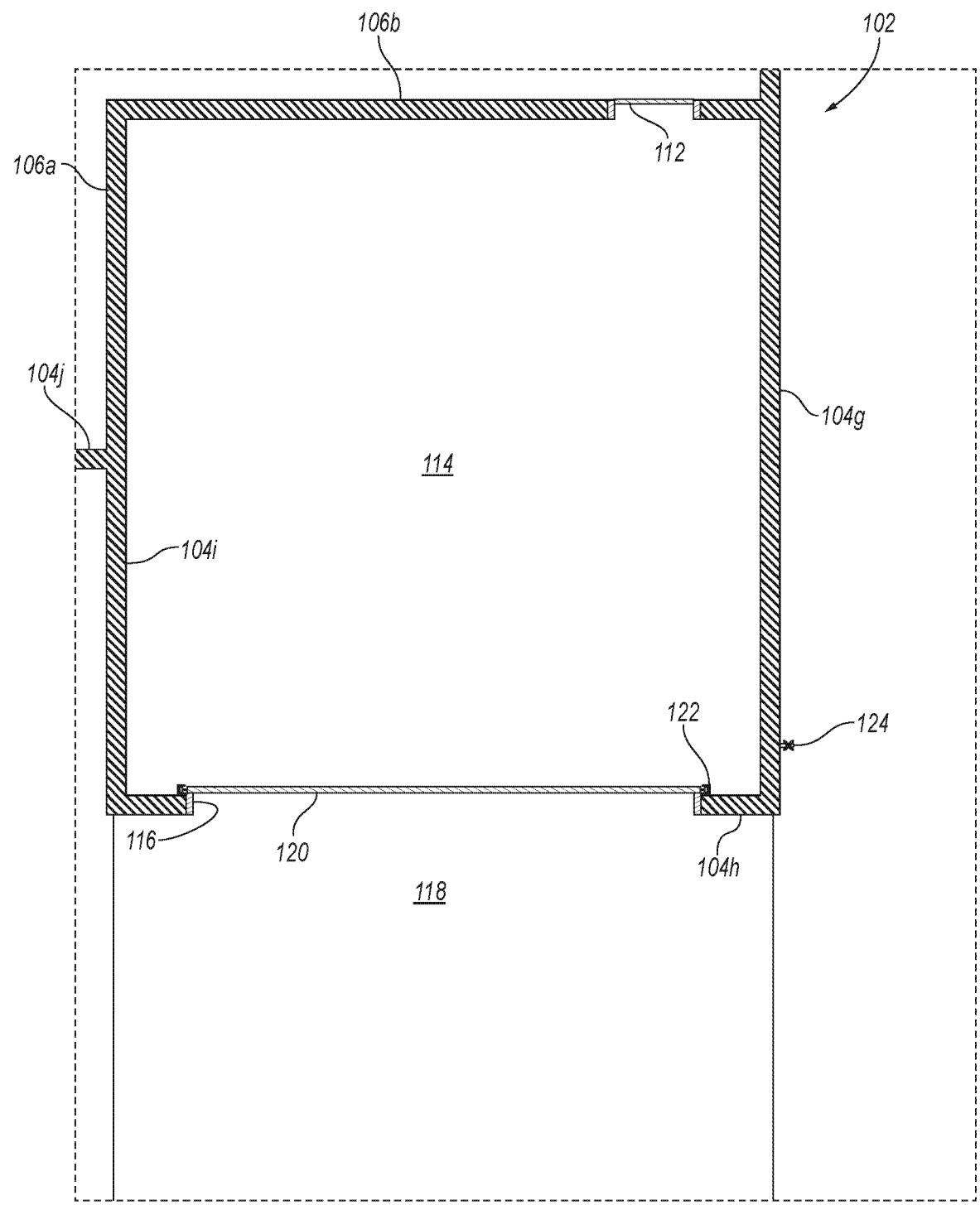
FIG. 3 is an enlarged view of a portion of FIG. 2.

FIG. 3 is an enlarged view of a portion of FIG. 2. As shown in FIG. 3, the garage 102 can include a door track 122 at the opening 116. The overhead door 120 can be operably connected to the door track 122. The garage 102 can further include a hose bibb 124 at an exterior side of the exterior wall 104g. Although the house 100 in the illustrated embodiment is a single-family house and the garage 102 is an attached garage, it should be understood that, in other embodiments, another type of primary building (e.g., a multi-family residential building) can be substituted for the house 100 and/or a detached garage can be substituted for the garage 102. Furthermore, although the garage 102 in the illustrated embodiment is a two-car garage, in other embodiments, a counterpart of the garage 102 can be a one-car garage, a three-car garage, or a garage of another suitable type.

Figure 4:
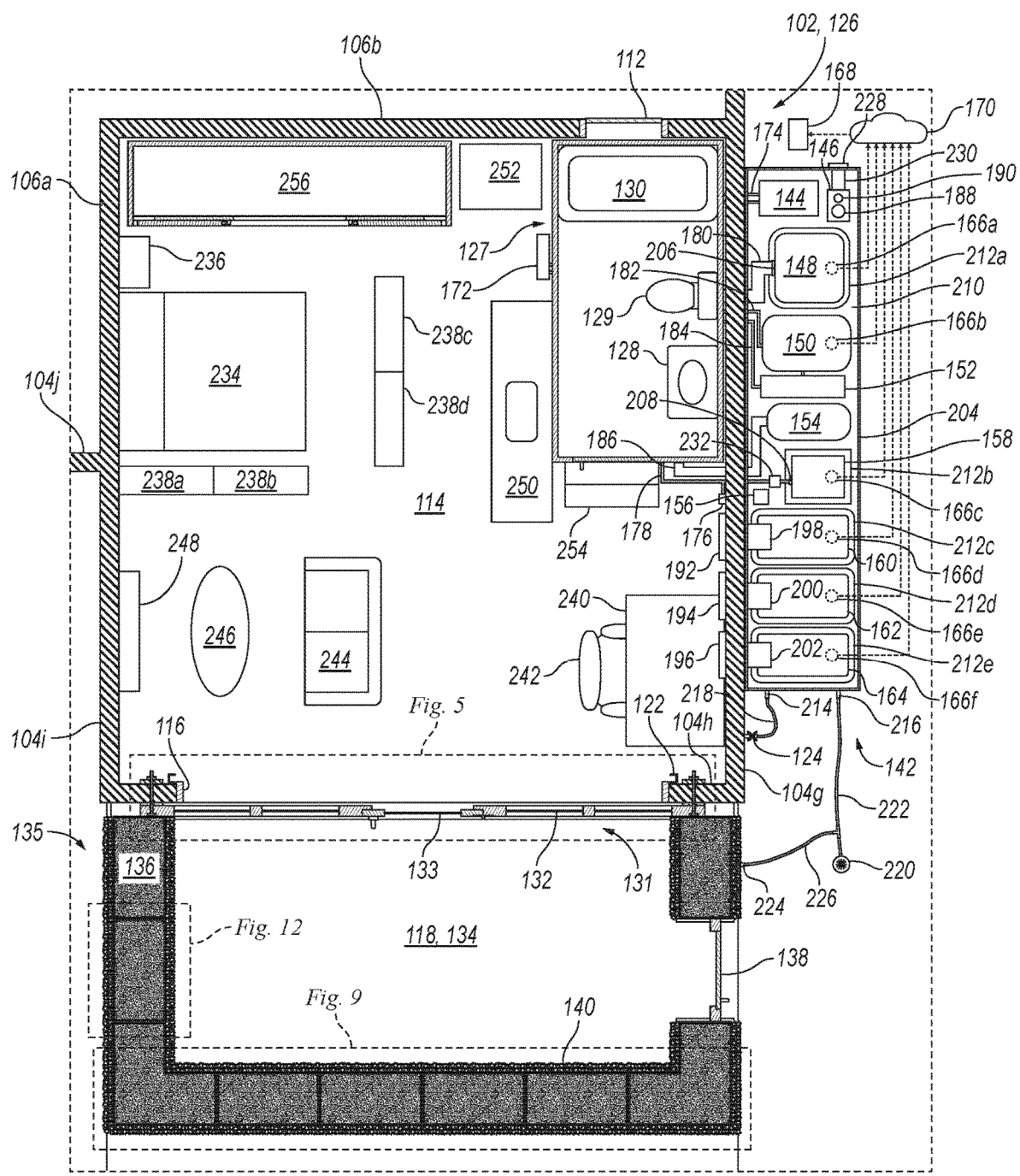
FIG. 4 is a cross-sectional top plan view corresponding to the portion of FIG. 2 shown in FIG. 3 and showing a real estate unit in accordance with an embodiment of the present technology including an interior region of the garage of the single-family house shown in FIG. 1 with the garage in a second state.

FIG. 4 is a cross-sectional top plan view corresponding to the portion of FIG. 2 shown in FIG. 3 and showing a real estate unit 126 in accordance with an embodiment of the present technology. The real estate unit 126 can include the interior region 114 in a second state, which can be an alternative-use, non-original, retrofitted, post-retrofit, or similar state. In at least some embodiments, the garage 102 is retrofitted (e.g., at least substantially reversibly retrofitted) to accommodate a non-garage alternative use (e.g., a lodging, residential, office, and/or assembly use) at the interior region 114. The real estate unit 126 can further include the outdoor area 118, which can be retrofitted (e.g., at least substantially reversibly retrofitted) for courtyard use and/or another suitable use ancillary to the alternative use of the interior region 114. The retrofitting of the interior region 114 can occur well after (e.g., at least 20 years after) the garage 102 was originally constructed.

The real estate unit 126 can include retrofits (e.g., at least substantially reversible retrofits) to the garage 102 that change the garage 102 from being well suited for garage use to being well suited for the alternative use. In at least some cases, reversal of all or a portion of these retrofits returns the garage 102 from being well suited for the alternative use to again being well suited for the garage use. Examples of reversible retrofits include removing, installing, and relocating furniture and fixtures with little or no associated demolition of the exterior walls 104g-104i and interior walls 106a, 106b or other permanent fabric of the garage 102. The garage 102 can be substantially reversibly retrofitted to accommodate the real estate unit 126. For example, a total cost of reversible retrofits to the garage 102 (e.g., a present value of at least substantially reversibly installed reusable components) for a given transformation from being well suited for garage use to being well suited for an alternative use can be greater (e.g., at least 50% greater or at least 100% greater) than a total cost of permanent retrofits to the garage 102 (e.g. modifications to the permanent fabric of the garage 102) for the given transformation. Capital associated with the alternative use can be readily re-deployable after the alternative use. In some cases, the alternative use and the real estate unit 126 are active for one year or less (e.g., six months or less) between successive transformations. In other cases, the alternative use and the real estate unit 126 can have longer durations or even be permanent.

As shown in FIG. 4, the real estate unit 126 can include a bathroom 127 disposed (e.g., removably disposed) within the interior region 114. The bathroom 127 can include a sink 128, a toilet 129, and a bath 130. In some embodiments, the bathroom 127 is reusable and removably disposed within the interior region 114. For example, unlike a conventional bathroom that can only be installed by heavy construction and removed by heavy demolition, the bathroom 127 can be configured to be installed with little or no need for heavy construction and removed with little or no need for heavy demolition. Furthermore, the bathroom 127 can be configured to be conveniently transported and reused after its removal. In the illustrated embodiment, the bathroom 127 is an assembly of reusable bathroom modules configured for rapid deployment into and removal from the interior region 114 in an at least partially disassembled state. For example, the bathroom 127 can be made up mostly or entirely of reusable modular components. In other embodiments, a counterpart of the bathroom 127 can be portable and configured for rapid deployment into and removal from the interior region 114 without significant disassembly. This deployment and removal can occur by forklift, by dolly, by operation of wheels integrated into the counterpart of the bathroom 127, or in another suitable manner. In still other embodiments, a counterpart of the bathroom 127 can have other suitable forms. As shown in FIG. 4, the bathroom 127 can be positioned within the interior region 114 such that it blocks access to the interior doorway 112. This can be useful, for example, to form a robust separation between the interior region 114 and other portions of the house 100.

The real estate unit 126 can further include a barrier 131 disposed between the interior region 114 and the outdoor area 118. For example, a path permitting a renter of the real estate unit 126 to move between the interior region 114 and the outdoor area 118 can extend through the opening 116 and through the barrier 131. Furthermore, the barrier 131 can be stationarily disposed between the interior region 114 and the outdoor area 118. For example, unlike the overhead door 120, which is typically configured to move on a regular basis during normal operation of the garage 102 in the first state, the barrier 131 can be configured to remain at least substantially stationary during normal operation of the real estate unit 126. The barrier 131 can be fenestrated and can include windows 132 that allow natural light to enter the interior region 114 from the outdoor area 118. The barrier 131 can further include a door 133. In at least some embodiments, the barrier 131 is foldable to facilitate its transport and storage when not in use. For example, the barrier 131 can be foldable along vertical seams (not shown) between neighboring windows 132 and/or between the door 133 and windows 132 neighboring the door 133.

The barrier 131 can be reusable and removably disposed between the interior region 114 and the outdoor area 118. For example, the barrier 131 can be configured to be installed with little or no need for heavy construction and removed with little or no need for heavy demolition. Furthermore, the barrier 131 can be configured to be conveniently transported and reused after its removal. In the illustrated embodiment, the barrier 131 is rigid, portable and configured for rapid deployment into and removal from operable association with the interior region 114 without significant disassembly. This deployment and removal can occur by forklift, by dolly, by operation of wheels (not shown) integrated into the barrier 131, or in another suitable manner. In other embodiments, a counterpart of the barrier 131 can be an assembly of reusable barrier modules configured for rapid deployment into and removal from between the interior region 114 and the outdoor area 118 in an at least partially disassembled state. For example, a counterpart of the barrier 131 can be made up mostly or entirely of reusable modular components.

With reference again to FIG. 4, the real estate unit 126 can include a courtyard 134 at the outdoor area 118. For example, the real estate unit 126 can include an exterior enclosure 135 including wall components 136 and a gate 138 disposed at a perimeter portion of the courtyard 134. The wall components 136, the gate 138, and/or other suitable components of the exterior enclosure 135 can be reusable and removably disposed at the perimeter portion of the courtyard 134. For example, the exterior enclosure 135 can be made up mostly or entirely of reusable modular components. As discussed in further detail below, the wall components 136 can be stacked and/or interlocking within the exterior enclosure 135. Furthermore, the wall components 136 can be planters that support vegetation 140. For example, the wall components 136 can internally support a root system (not shown) of the vegetation 140. Thus, the exterior enclosure 135 can include living walls.

In the illustrated embodiment, the real estate unit 126 is configured to be mostly off-grid (i.e., independent of service connections to local utilities). This configuration can be useful, for example, to avoid costs and complications associated with utility hookups, to reduce the environmental impact of the real estate unit 126, to facilitate efficient management of the real estate unit 126, to reduce costs associated with maintaining the real estate unit 126 during periods of nonuse or low use, and/or for other reasons. In other embodiments, a counterpart of the real estate unit 126 can be mostly or entirely on-grid (i.e., dependent on service connections to local utilities).

With reference again to FIG. 4, the real estate unit 126 can include a dock 142 removably disposed outside the interior region 114. The dock 142 can be above-ground (as illustrated) or below-ground (e.g., disposed within a pit). At the dock 142, the real estate unit 126 can include a heat pump 144, an exhaust filter 146, a blackwater tank 148, a water reservoir 150, a water heater 152, a greywater filter 154, a wireless router 156, a battery 158, a trash bin 160, a recycling bin 162, and a laundry bin 164. The water reservoir 150 can be operably connected to the hose bibb 124 and can be configured to increase a capacity of the hose bibb 124 to supply water to the bathroom 127, such as by attenuating spikes in demand for water from the bathroom 127. In the illustrated embodiment, the real estate unit 126 is configured to separately manage removal and disposal of blackwater (e.g., wastewater from the toilet 129) and greywater (e.g., wastewater from the sink 128 and the bath 130). In other embodiments, a counterpart of the real estate unit 126 can be configured to collectively manage removal and disposal of blackwater and greywater. Accordingly, the blackwater tank 148 can be more generally referred to as a sewage tank indicating that it can be configured to receive primarily blackwater, primarily greywater, or both blackwater and greywater.

With reference again to FIG. 4, the exhaust filter 146, the blackwater tank 148, the battery 158, the trash bin 160, the recycling bin 162, and the laundry bin 164 can be removably connected to the dock 142 or otherwise removably disposed within or outside the interior region 114. In the illustrated embodiment, the real estate unit 126 is configured to operate on-grid with respect to a water supply (i.e. because the water reservoir 150 is operably connected (for replenishment) to a water service for the house 100 via the hose bibb 124) and configured to be off-grid with respect to an electrical supply and disposal of blackwater from the toilet 129. In other embodiments, a counterpart of the real estate unit 126 can be off-grid with respect to water supply (e.g., because the water reservoir 150 is configured to be independently refilled or swapped), on-grid with respect to electrical supply (e.g., because the battery 158 is operably connected (e.g., for recharging) to an electrical service for the house 100), and/or on-grid with respect to sewage disposal (e.g. because the blackwater tank 148 is operably connected (e.g., for draining) to a municipal sewage line for the house 100).

With reference again to FIG. 4, the real estate unit 126 can be configured to receive occasional servicing. This servicing can be include collecting backwater, trash, recyclables, and laundry (e.g., for cleaning and return) from the blackwater tank 148, the trash bin 160, the recycling bin 162, and the laundry bin 164, respectively. The servicing can also include recharging the battery 158. In at least some cases, the blackwater tank 148 is configured to be swapped for removal of blackwater from the real estate unit 126. Similarly, the battery 158 can be configured to be swapped for replenishment of an electrical supply to the real estate unit 126. This can reduce or eliminate the need for recharging the battery 158. A less-full replacement for the blackwater tank 148, a more-fully-charged replacement for the battery 158, and/or other suitable replacements for components of the real estate unit 126 can be delivered to the real estate unit 126 by truck or in another suitable manner. The replaced components can be collected in the same or a different manner and transported to a central location where the components can be efficiently processed (e.g., emptied, cleaned, recharged, etc.) for reuse. This delivery and collection can occur on a regular schedule (e.g., daily, every-other-day, etc.), as needed, and/or on demand.

The dock 142 can include sensors 166 (individually identified as sensors 166a-166f) operably connected to the blackwater tank 148, the water reservoir 150, the battery 158, the trash bin 160, the recycling bin 162, and the laundry bin 164, respectively. The sensors 166 can be wirelessly connected to a remote server 168 via the router 156 and a network 170 (e.g., the Internet). The server 168 can include software that automatically processes data from the sensors 166 to determine when servicing of the real estate unit 126 is required. For example, data from the sensor 166a may indicate that the blackwater tank 148 is at 75% of capacity and needs to be drained or swapped promptly. As another example, data from the sensor 166b may indicate that the water reservoir 150 is being depleted faster than it can be replenished via the hose bibb 124 and, therefore, needs to be independently replenished promptly. As yet another example, data from the sensor 166c may indicate that the battery 158 is at 25% of capacity and needs to be recharged or swapped promptly. Over time, aggregate data from the sensors 166 can be analyzed to establish default servicing intervals for the real estate unit 126. In addition or alternatively, data from the sensors 166 can be used to calculate utility usage for the real estate unit 126 for purposes of environmental reporting and/or billing a renter of the real estate unit 126. Each of the individual sensors 166a-166f can be of a suitable type for monitoring the corresponding component of the real estate unit 126. For example, the sensors 166a, 166b, 166d-166f, individually, can be weight sensors, level sensors, or other types of sensors configured to measure fullness of the blackwater tank 148, the water reservoir 150, the trash bin 160, the recycling bin 162, and the laundry bin 164, respectively. As another example, the sensor 166c can be a charge meter or another type of sensor configured to measure a charge of the battery 158.

The real estate unit 126 can include suitable utility lines and other connections that extend from components of the real estate unit 126 within the interior region 114 to components of the real estate unit 126 or other structures outside of the interior region 114. For example, the real estate unit 126 can include a heater/cooler 172 within the interior region 114, and refrigerant lines 174 extending between the heater/cooler 172 and the heat pump 144. The real estate unit 126 can further include an electrical outlet 176 serving the interior region 114, and an electrical line 178 extending between the electrical outlet 176 and the battery 158. The battery 158, therefore, can be configured to power an appliance (not shown) within the interior region 114 via the electrical outlet 176 and the electrical line 178. As additional examples of suitable utility lines, the real estate unit 126 can include a blackwater drain line 180 extending between the bathroom 127 and the blackwater tank 148, a cold water supply line 182 extending between the bathroom 127 and the water reservoir 150, a hot water supply line 184 extending between the bathroom 127 and the water heater 152, a greywater drain line 186 extending between the bathroom 127 and the greywater filter 154, a plumbing ventilation line 188 extending between the bathroom 127 and the exhaust filter 146, and an exhaust line 190 also extending between the bathroom 127 and the exhaust filter 146. The blackwater drain line 180 and the greywater drain line 186 can be sloped to convey liquid waste from the bathroom 127 toward the blackwater tank 148 and the greywater filter 154, respectively, at least partially by gravity. To facilitate this sloping and/or for other reasons, the bathroom 127 can have a floor level at least 0.5 meter (e.g., at least 1 meter) higher than an underlying floor level of the interior region 114. In the illustrated embodiment, the blackwater drain line 180 and the greywater drain line 186 are separate. In other embodiments, a counterpart of the real estate unit 126 can include combined blackwater and greywater lines. Accordingly, the blackwater drain line 180 and the greywater drain line 186 can be more generally referred to as a plumbing drain lines indicating that they can be configured to convey primarily blackwater, primarily greywater, or both blackwater and greywater.

The real estate unit 126 can further include a trash hatch 192, a recycling hatch 194, and a laundry hatch 196 within the interior region 114. The real estate unit 126 can also include a trash chute 198 extending between the trash hatch 192 and the trash bin 160, a recycling chute 200 extending between the recycling hatch 194 and the recycling bin 162, and a laundry chute 202 extending between the laundry hatch 196 and the laundry bin 164. The refrigerant lines 174, electrical line 178, blackwater drain line 180, cold water supply line 182, hot water supply line 184, greywater drain line 186, plumbing ventilation line 188, exhaust line 190, trash chute 198, recycling chute 200, and laundry chute 202 can extend through the exterior wall 104g. For example, some or all of these lines and chutes can extend through retrofitted openings in the exterior wall 104g. In at least some embodiments, these openings are readily patchable to facilitate returning the interior region 114 to garage use if the real estate unit 126 is decommissioned. The lines and chutes can be removably disposed inside and/or outside the interior region 114. For example, the lines and chutes can be temporary and configured for reuse or disposal upon decommissioning of the real estate unit 126. In at least some embodiments, the blackwater drain line 180 and the greywater drain line 186 extend above-floor and then aboveground from the bathroom 127 toward the blackwater tank 148 and the greywater filter 154, respectively.

The dock 142 can include additional lines, connections, and other suitable components ancillary to the components of the real estate unit 126 at the dock 142. For example, the dock 142 can include a housing 204 that provides security and protection from weather to components of the real estate unit 126 at the dock 142. The housing 204 can include a lid (not shown) configured to be open when the real estate unit 126 is being serviced and closed and locked when the real estate unit 126 is not being serviced. In at least some embodiments, the lid includes solar panels (also not shown) operably connected to the battery 158. The dock 142 can further include couplings along some or all of the lines and chutes described above. These couplings can separate portions of the lines and chutes within the housing 204 from portions of the lines and chutes outside the housing 204. Thus, by operation of these couplings, the dock 142 can be transportable as a unit with little or no need to modify internal portions of the dock 142 in the field. For example, the dock 142 can be pre-manufactured with the internal components shown in FIG. 4, installed at the location shown in FIG. 4, and then connected up to portions of the associated lines and chutes outside of the housing 204.

The dock 142 can further include couplings that facilitate convenient removal and replacement (e.g., swapping) of the blackwater tank 148, the battery 158, the trash bin 160, the recycling bin 162, and the laundry bin 164. For example, the dock 142 can include a blackwater drain quick-connect coupling 206 through which the blackwater tank 148 is fluidically connected to the blackwater drain line 180 and the bathroom 127. In at least some embodiments, the drain quick-connect coupling 206 includes a check valve. Similarly, the dock 142 can include an electrical quick-connect coupling 208 through which the battery 158 is electrically connected to the electrical line 178 and the electrical outlet 176. The dock 142 can also include a floor 210 having pads 212 (individually identified as pads 212a-212e) that facilitate convenient registration of the blackwater tank 148, the battery 158, the trash bin 160, the recycling bin 162, and the laundry bin 164 with the blackwater drain quick-connect coupling 206, the electrical quick-connect coupling 208, the trash chute 198, the recycling chute 200, and the laundry chute 202, respectively. For example, the pads 212a-212e can be insets in the floor 210 that snuggly receive corresponding lower portions of the blackwater tank 148, the battery 158, the trash bin 160, the recycling bin 162, and the laundry bin 164, respectively.

As shown in FIG. 4, the dock 142 can include a potable water inlet 214 and a greywater outlet 216. The real estate unit 126 can include a first hose 218 extending between the hose bibb 124 and the potable water inlet 214. The real estate unit 126 can further include sprinkler 220 and a second hose 222 extending between the greywater outlet 216 and the sprinkler 220. The exterior enclosure 135 can include a greywater inlet 224 fluidically connected to a branch 226 of the second hose 222. Filtered greywater can be distributed to support grass or other vegetation (not shown) via the sprinkler 220, and distributed to support the vegetation 140 via an internal distribution system (e.g., a network of hoses; not shown) of the exterior enclosure 135. The dock 142 can include internal plumbing (e.g., under the floor 210; not shown) fluidically connecting the water reservoir 150 and the potable water inlet 214, and fluidically connecting the greywater filter 154 and the greywater outlet 216. In at least some embodiments, this internal plumbing includes a pump (not shown). The dock 142 can further include an exhaust output fan 228 and an internal duct 230 extending between the exhaust output fan 228 and the exhaust filter 146. The dock 142 can also include an inverter 232 operably connected to the electrical line 178.

The real estate unit 126 can be furnished or otherwise outfitted with suitable furnishings, fixtures, accessories, etc. to accommodate its non-garage alternative use. In the illustrated embodiment, the real estate unit 126 is a lodging and/or residential unit with suitable furnishings, fixtures, accessories, etc. within the interior region 114 to accommodate lodging and/or residential use of the interior region 114. These furnishings, fixtures, accessories, etc. can include a bed 234, a side table 236, shelving units 238 (individually identified as shelving units 238a-238d), a writing table 240, a chair 242, a sofa 244, a coffee table 246, a television 248, a kitchenette 250, a refrigerator 252, and a set of step stairs 254. The kitchenette 250 and the set of step stairs 254 can be operably associated with the bathroom 127. The real estate unit 126 can further include a closet 256 disposed (e.g., removably disposed) within the interior region 114. In other embodiments, a counterpart of the real estate unit 126 can include other suitable furnishings, fixtures, accessories, etc. As described in further detail below, real estate units in accordance with other embodiments of the present technology can be rentable office units, rentable assembly units, and/or have other suitable primarily uses in addition to or instead of lodging and/or residential uses. Furthermore, rentable real estate units in accordance with embodiments of the present technology can be directly rentable, rentable via a membership system (e.g., in a member-based network of real estate units), rentable under short-term use arrangements (e.g., lodging arrangements), and/or rentable in another suitable manner.

Figure 5:
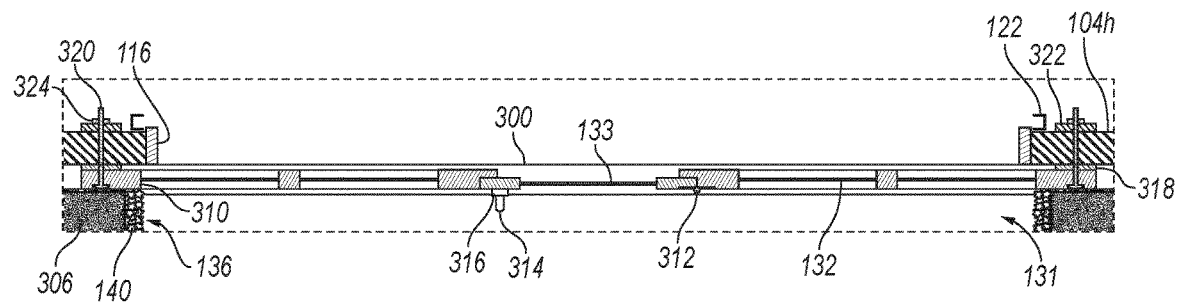
FIG. 5 is an enlarged view of a first portion of FIG. 4 showing a barrier of the real estate unit.
Figure 6:
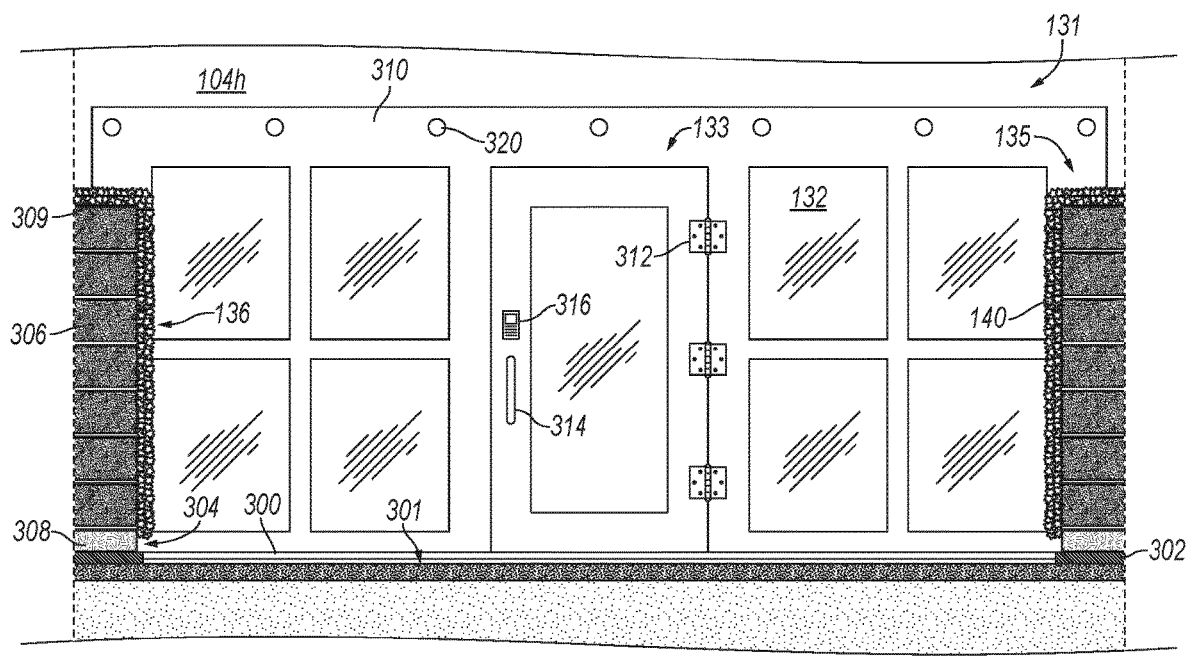
FIGS. 6 and 7 are, respectively, a cross-sectional exterior side profile view and a cross-sectional interior side profile view of a portion of the real estate unit shown in FIG. 4 corresponding to the first portion of FIG. 4 shown in FIG. 5.
Figure 7:
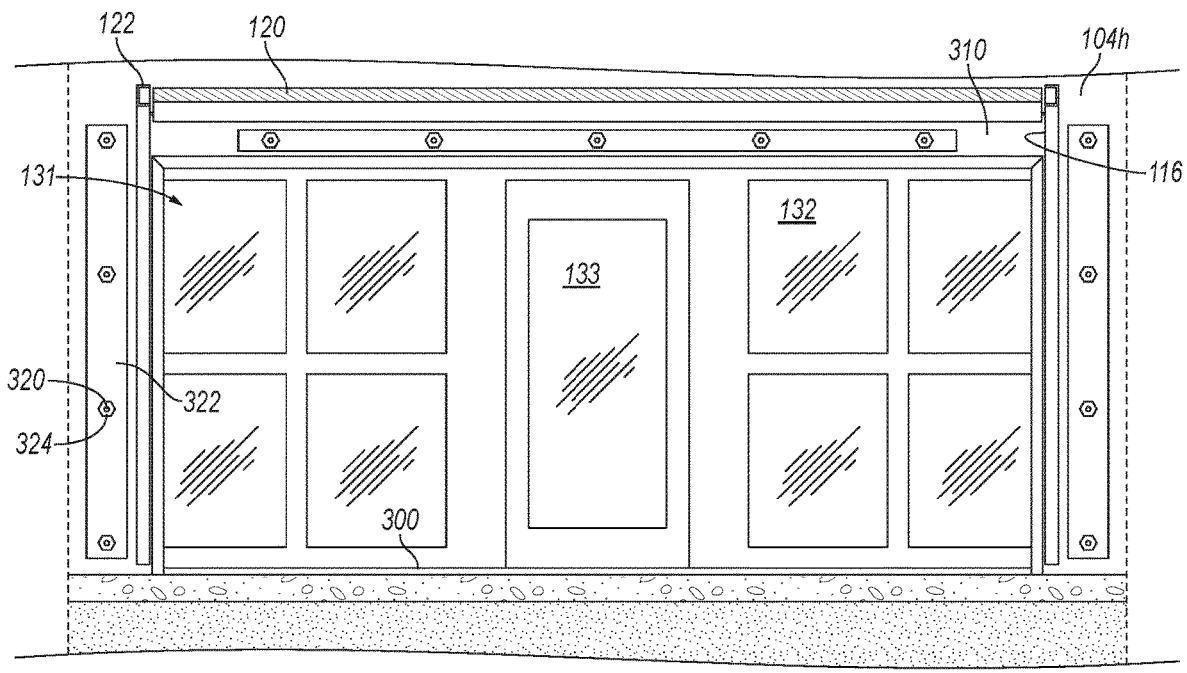

FIG. 5 is an enlarged view of a first portion of FIG. 4 showing the barrier 131. FIGS. 6 and 7 are, respectively, a cross-sectional exterior side profile view and a cross-sectional interior side profile view of a portion of the real estate unit 126 corresponding to the first portion of FIG. 4 shown in FIG. 5. With reference to FIGS. 4-7 together, the barrier 131 can include a first mass of self-leveling material 300 (e.g., a first disposable mass of hardened self-leveling grout) underlying the barrier 131. The first mass of self-leveling material 300 can be molded and, in at least some cases, is integrally formed along most or all of an overall footprint of the barrier 131. During formation of the first mass of self-leveling material 300, the constituent self-leveling material can be of sufficiently low viscosity to level itself by gravity. Thus, the first mass of self-leveling material 300 can automatically conform to slopes, dips, and/or other irregularities in a ground surface at which the barrier 131 is installed.

In at least some embodiments, the outdoor area 118 has a paved surface 301 that is not level. The exterior enclosure 135 can include a second mass of self-leveling material 302 (e.g., a second disposable mass of hardened self-leveling grout) underlying the wall components 136. Similar to the first mass of self-leveling material 300, the second mass of self-leveling material 302 can be molded and, in at least some cases, is integrally formed along most or all of an overall footprint of the exterior enclosure 135. During formation of the second mass of self-leveling material 302, the constituent self-leveling material can be of sufficiently low viscosity to level itself by gravity. Thus, the second mass of self-leveling material 302 can automatically conform to slopes, dips, and/or other irregularities in the paved surface 301. When at least partially cured, the second mass of self-leveling material 302 can provide the exterior enclosure 135 with a reliably level surface that facilitates vertical stacking of the wall components 136.

As shown in FIG. 6, the exterior enclosure 135 can include base blocks 304 between the second mass of self-leveling material 302 and the lowermost row of the wall components 136. The wall components 136 can be hollow and can contain planting medium 306. The base blocks 304 can also be hollow and can include antimicrobial medium 308. The exterior enclosure 135 can further include a soaker hose 309 that receives filtered greywater from the branch 226 of the second hose 222. In the illustrated embodiment, the soaker hose 309 is loosely disposed in a serpentine manner at an upper portion of an uppermost row of the wall components 136 within the exterior enclosure 135. The soaker hose 309 can distribute filtered greywater throughout the planting medium 306 at the uppermost row of the wall components 136. Once the planting medium 306 at the uppermost row of the wall components 136 is saturated, the filtered greywater can move by gravity and/or capillary action to the planting medium 306 at a second-to-uppermost row of the wall components 136 within the exterior enclosure 135. This process can continue until the filtered greywater reaches the antimicrobial medium 308. The antimicrobial medium 308 can be a synthetic sponge or other suitable substrate that reduces or eliminates pools of the excess filtered greywater from developing within the base blocks 304. Excess filtered greywater within the antimicrobial medium 308 can drain from the base blocks 304 onto the paved surface 301 and along the paved surface 301 to a storm drain (not shown). In other embodiments, the filtered greywater can be distributed through the exterior enclosure 135 in another suitable manner. For example, a counterpart of the exterior enclosure 135 can include separate soaker hoses at respective rows of wall components 136. These soaker hoses can be connected to the branch 226 of the second hose 222 via a manifold. In still other embodiments, a counterpart of the exterior enclosure 135 can have an irrigation system that uses freshwater instead of filtered greywater, or no irrigation system at all.

With reference again to FIGS. 4-7 together, the barrier 131 can include a frame 310, hinges 312 operably connecting the door 133 and the frame 310 to one another, and a handle 314 that facilitates operation of the door 133 from outside the interior region 114. The barrier 131 can further include a smart lock 316 configured to allow a renter of the real estate unit 126 to unlock the door 133 by operation of a mobile device (e.g. a mobile phone), by entering a passcode, by providing a biometric identification (e.g., a fingerprint), or in another suitable manner. The barrier 131 can be removably fastened to the exterior wall 104h. In the illustrated embodiment, the barrier 131 is removably bolted to the exterior wall 104h. In other embodiments, a counterpart of the barrier 131 can be removably screwed to the exterior wall 104h, removably clamped to the exterior wall 104h, and/or removably fastened to the exterior wall 104h in another suitable manner in addition to or instead of being removably bolted to the exterior wall 104h. In still other embodiments, a counterpart of the barrier 131 can be permanently installed at the exterior wall 104h.

With reference again to FIGS. 4-7, the barrier 131 can include a gasket 318 disposed between the frame 310 and the exterior wall 104h. The gasket 318 can be compressible such that it conforms to irregularities in the exterior wall 104h and thereby enhances a weather resistance of a connection between the barrier 131 and the exterior wall 104h. The barrier 131 can further include bolts 320 that extend through the frame 310, through the gasket 318, and through the exterior wall 104h. At an inside surface of the exterior wall 104h, the barrier 131 can include furring strips 322 through which the bolts 320 also extend, and nuts 324 operably connected to the bolts 320 and bearing on the furring strips 322. In the illustrated embodiment, the barrier 131 is an overlay that covers the opening 116 at an exterior side of the exterior wall 104h. In other embodiments, the barrier 131 can have another suitable form and/or position relative to the opening 116. For example, rather than being disposed at the exterior side of the exterior wall 104h, a counterpart of the barrier 113 can be disposed at an interior side of the exterior wall 104h.

As shown in FIG. 7, in the illustrated embodiment, the overhead door 120 is stowed within the interior region 114 in an open state. For example, the door track 122 can remain in place after the garage 102 is retrofitted for an alternative use. A motor (not shown) operably connected to the overhead door 120 can be temporarily disabled so that the overhead door 120 remains out-of-service during operation of the real estate unit 126. Leaving the overhead door 120 and the door track 122 in place after the garage 102 is retrofitted for an alternative use can be useful, for example, to reduce an investment necessary to return the interior region 114 to garage use, as needed. In other embodiments, the overhead door 120 can be removed from the interior region 114 when the garage 102 is retrofitted for an alternative use. In still other embodiments, a counterpart of the overhead door 120 can be retrofitted with windows and/or a doorway. In these embodiments, the counterpart of the overhead door 120 can take the place of the barrier 131.

Figure 8:
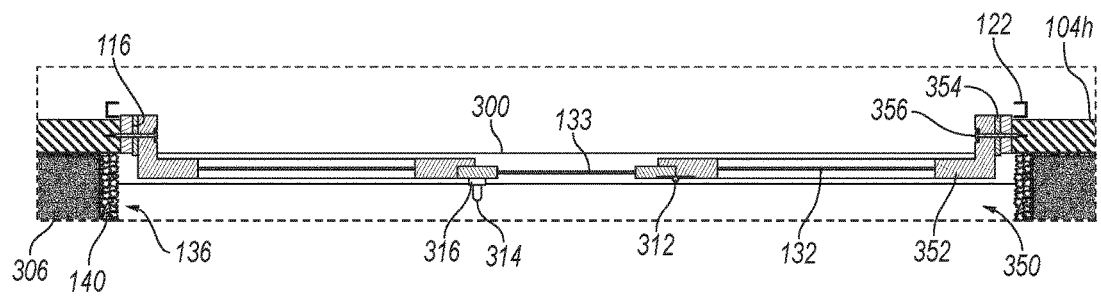
FIG. 8 is a top plan view corresponding to the first portion of FIG. 4 shown in FIG. 5 and showing a barrier of a real estate unit in accordance with another embodiment of the present technology.

FIG. 8 is a top plan view corresponding to the first portion of FIG. 4 shown in FIG. 5 and showing a barrier 350 of a real estate unit in accordance with another embodiment of the present technology. In contrast to the barrier 131 shown in FIGS. 4-7, the barrier 350 is an inset rather than an overlay. For example, the barrier 350 can be disposed within the opening 116 rather than at an exterior or interior side of the exterior wall 104h. As shown in FIG. 8, the barrier 350 can include a frame 352 that is narrower than the opening 116. The barrier 350 can further include a gasket 354 disposed between the frame 352 and sidewalls of the opening 116. The barrier 350 can also include screws 356 extending laterally into portions of the exterior wall 104h on opposite sides of the opening 116. The gasket 354 can be layered to compensate for a difference between a width of the frame 352 and a width of the opening 116, such as when the barrier 350 is a standard size and the opening 116 is a non-standard size. Although not adaptable to as wide a range of opening widths as the barrier 131 described above, the barrier 350 may be preferred over the barrier 131 in some cases for aesthetic or other reasons.

Figure 9:
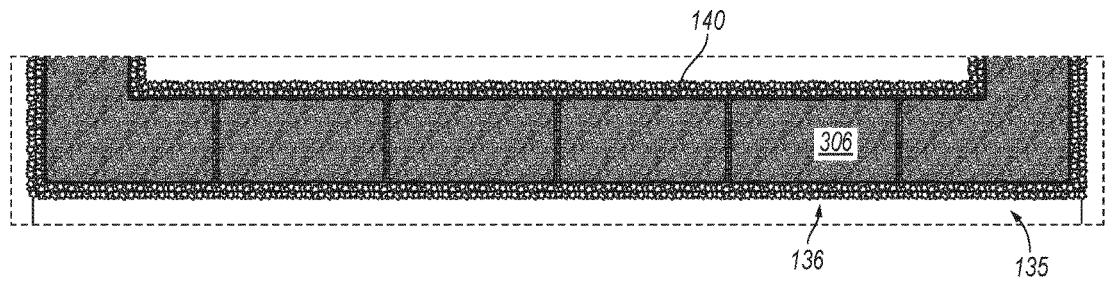
FIG. 9 is an enlarged view of a second portion of FIG. 4 showing an exterior enclosure of the real estate unit.
Figure 10:
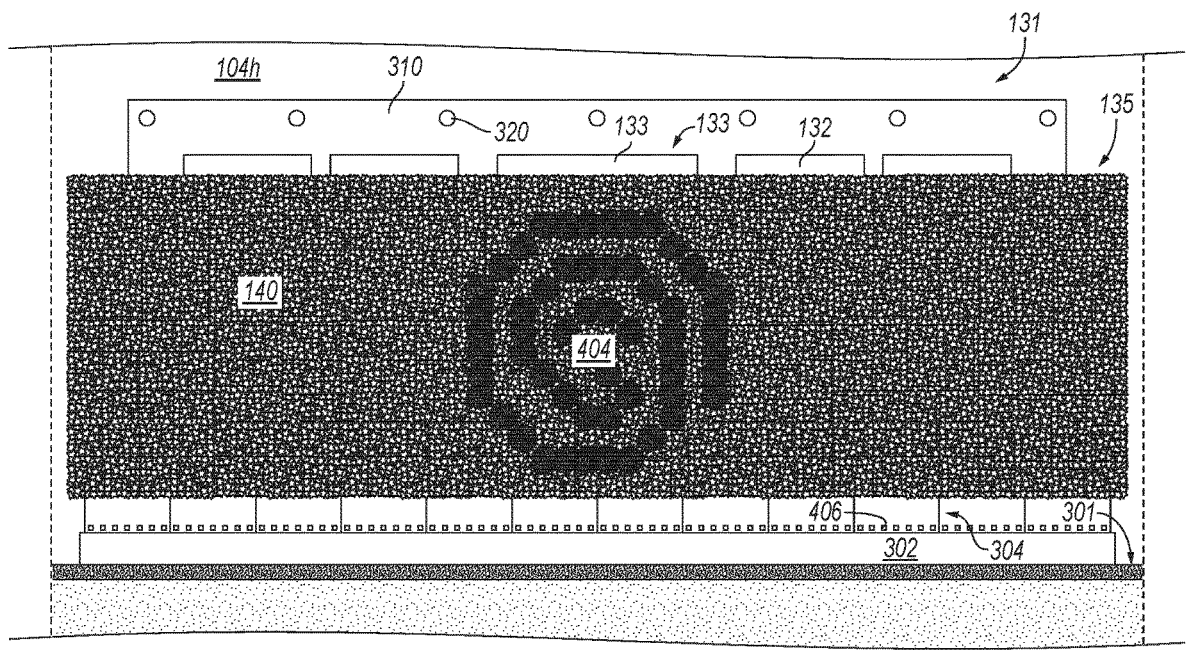
FIGS. 10 and 11 are cross-sectional exterior side profile views of a portion of the real estate unit shown in FIG. 4 corresponding to the second portion of FIG. 4 shown in FIG. 9 with vegetation of the exterior enclosure shown and not shown, respectively.
Figure 11:
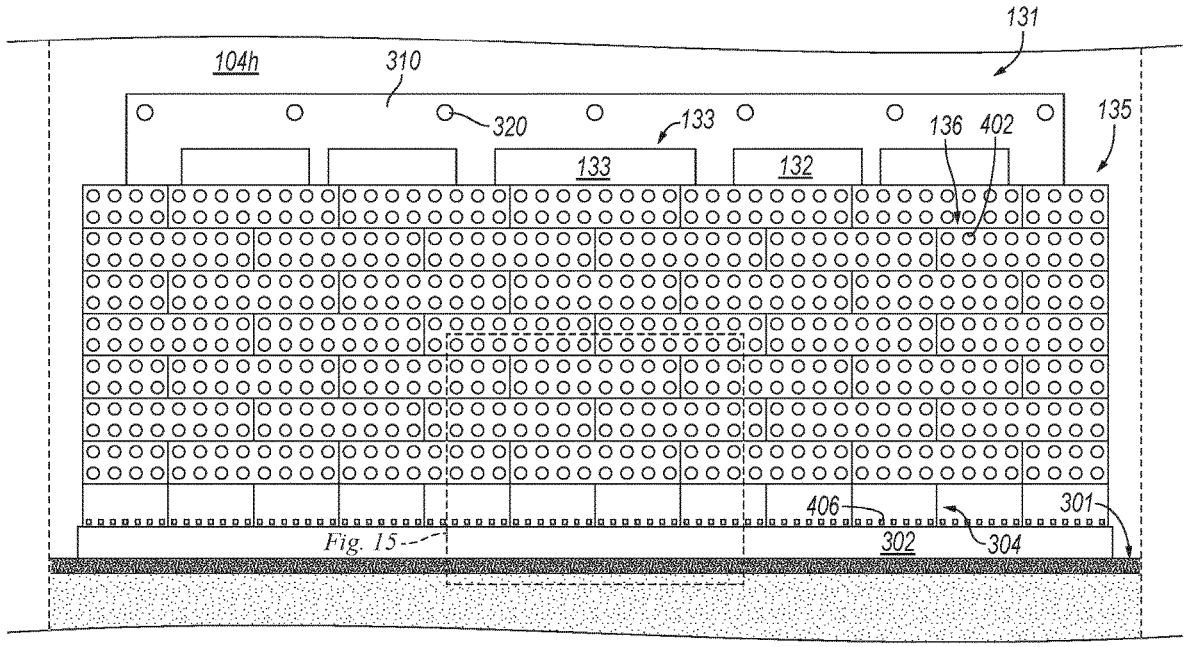
Figures 12, 13, 14:
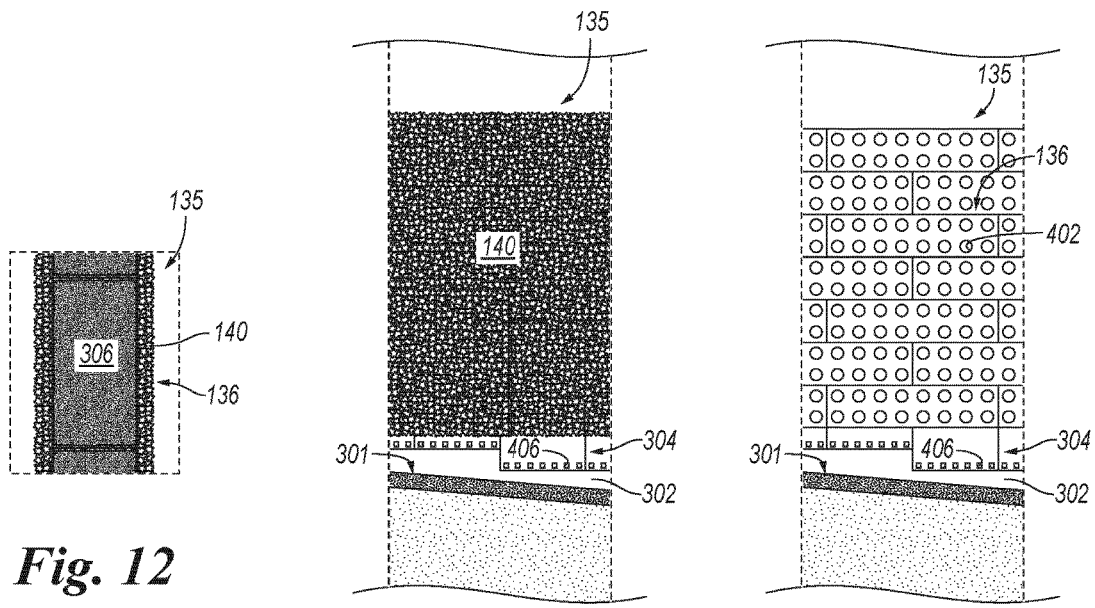
FIG. 12 is an enlarged view of a third portion of FIG. 4.
FIGS. 13 and 14 are cross-sectional exterior side profile views of a portion of the real estate unit shown in FIG. 4 corresponding to the third portion of FIG. 4 shown in FIG. 12 with vegetation of the exterior enclosure shown and not shown, respectively.
Figure 15:
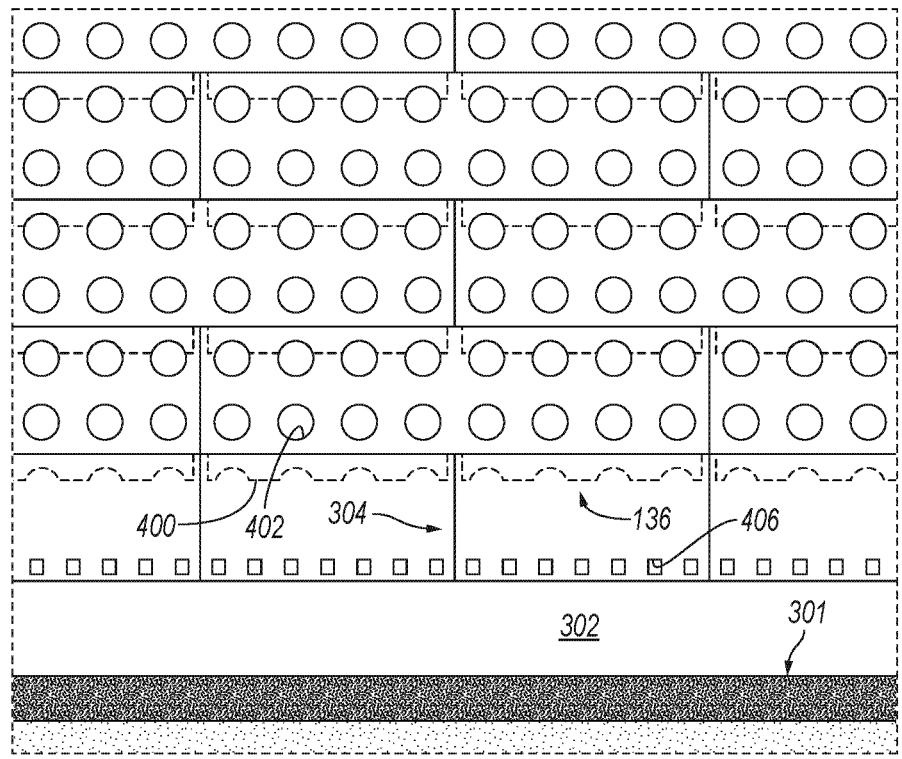
FIG. 15 is an enlarged view of a portion of FIG. 11.

FIG. 9 is an enlarged view of a second portion of FIG. 4 showing the exterior enclosure 135. FIGS. 10 and 11 are cross-sectional exterior side profile views of a portion of the real estate unit 126 corresponding to the second portion of FIG. 4 shown in FIG. 9 with the vegetation 140 shown and not shown, respectively. FIG. 12 is an enlarged view of a third portion of FIG. 4. FIGS. 13 and 14 are cross-sectional exterior side profile views of a portion of the real estate unit 126 corresponding to the third portion of FIG. 4 shown in FIG. 12 with the vegetation 140 shown and not shown, respectively. FIG. 15 is an enlarged view of a portion of FIG. 11. With reference to FIGS. 4-7 and 9-15 together, the exterior enclosure 135 can include staggered rows of the wall components 136. For example, the wall components 136 at corners of the exterior enclosure 135 distant from the exterior wall 104h can alternate row-to-row between larger and smaller L-shapes. Similarly, the wall components 136 at portions of the exterior enclosure 135 closest to the exterior wall 104h can alternate row-to-row between larger and smaller rectangular shapes. Elsewhere within the exterior enclosure 135, the wall components 136 can have the larger rectangular shape.

The overall exterior enclosure 135 can be self-supporting and/or free-standing. As shown in FIG. 15, the wall components 136 can be stacked within the exterior enclosure 135. Furthermore, the wall components 136 can be interlocking within the exterior enclosure 135. For example, the individual wall components 136 can include downwardly extending flanges 400 that are received within successively lower wall components 136. The base blocks 304 can be configured to receive the flanges 400 of the wall components 136 within a lowest row of wall components 136 within the exterior enclosure 135. As discussed above, the wall components 136 can be planters. In at least some embodiments, the wall components 136 include apertures 402 through which the vegetation 140 grows outwardly from roots (not shown) within the wall components 136. The apertures 402 can be large enough to allow passage of bulbs, cuttings, seedlings, etc. (not just seeds) into the planting medium 306 after the exterior enclosure 135 is assembled. For example, the individual apertures 402 can have a width greater than 2 centimeters, such as a width within a range from 2 to 8 centimeters. As discussed above, the exterior enclosure 135 can be configured to facilitate distribution of filtered greywater throughout the planting medium 306. The base blocks 304 can include holes 406 through which excess filtered greywater exits the exterior enclosure 135.

As shown in FIG. 10, the apertures 402 can be differentially planted to form a brand identifier 404 (e.g., a trade and/or service mark) or other suitable design at an exterior side (e.g., street-facing side) of the exterior enclosure 135. Differential planting can include selectively planting the apertures 402 with multiple types of plants and/or selectively planting and not planting the apertures 402 with a single type of plant. For example, the non-planted apertures 402 can be capped. Forming a brand identifier 404 by differential planting can be useful to balance aesthetic considerations in a neighborhood setting with the need for clear communication of a brand associated with the real estate unit 126 to consumers. The apertures 402 can collectively form an array that facilitates forming the brand identifier 404 in a consistent manner when the real estate unit 126 is one of many real estate units for which the brand identifier 404 is applicable. For example, a given aperture 402 can be planted with a predetermined plant depending on its position within the array according to a reproducible plan. A template (not shown) can be temporarily placed over the exterior side of the exterior enclosure 135 and registered to the array to facilitate rapid execution of the plan with little or no need for customized execution of the plan in the field. Furthermore, using relatively large and/or more mature plantings can allow the vegetation 140 to be formed more efficiently and/or with less lead time than would be the case using seeds.

Figure 16:
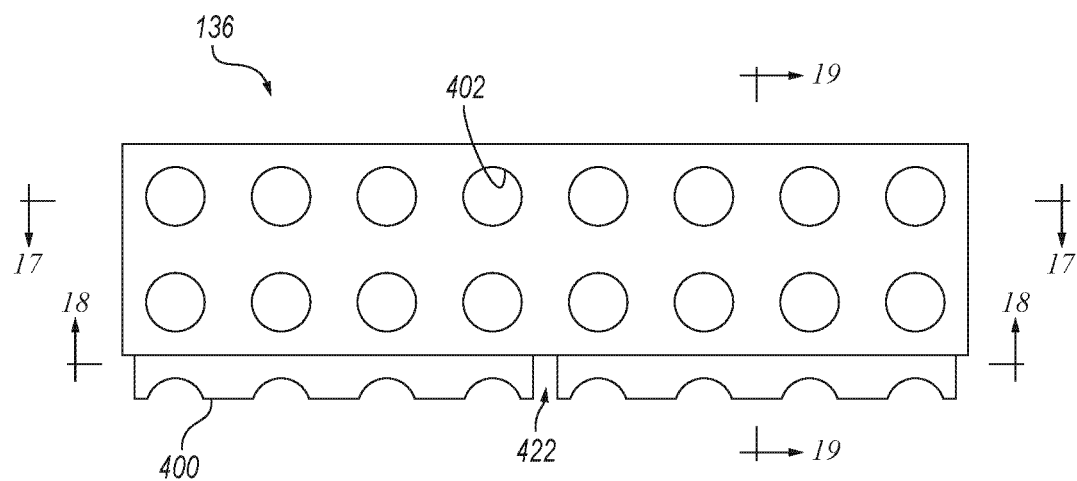
FIG. 16 is side profile view of a wall component of the exterior enclosure of the real estate unit shown in FIG. 4.
Figure 17:
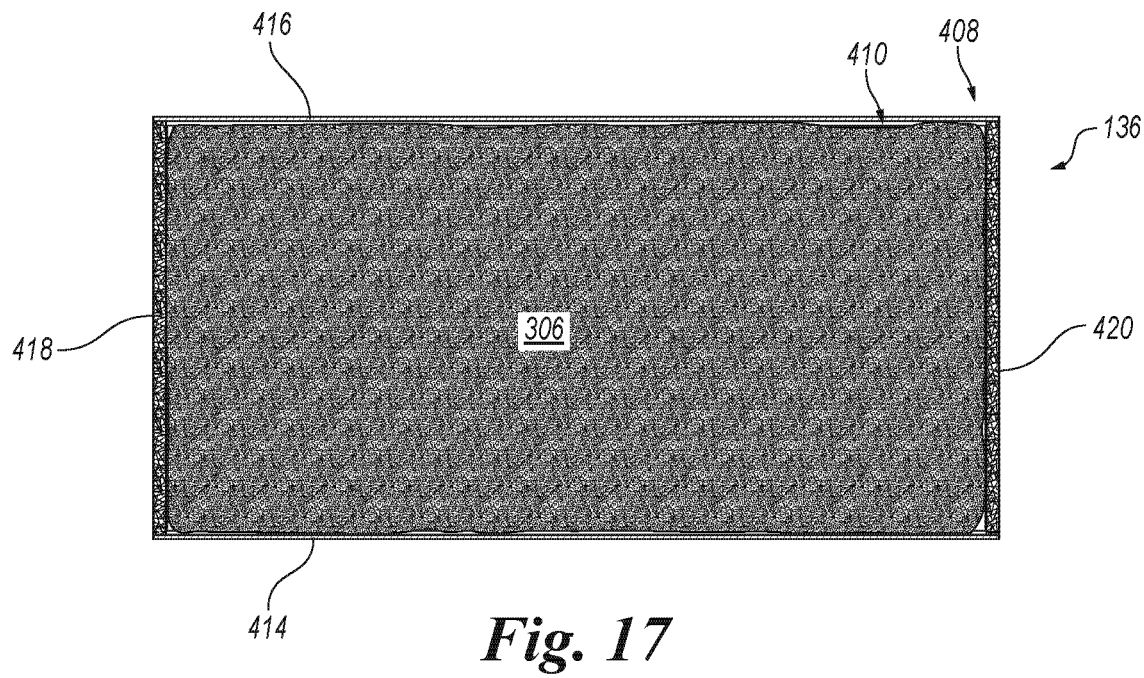
FIG. 17 is a cross-sectional top plan view of the wall component of the exterior enclosure of the real estate unit shown in FIG. 4 taken along the line 17-17 in FIG. 16.
Figure 18:
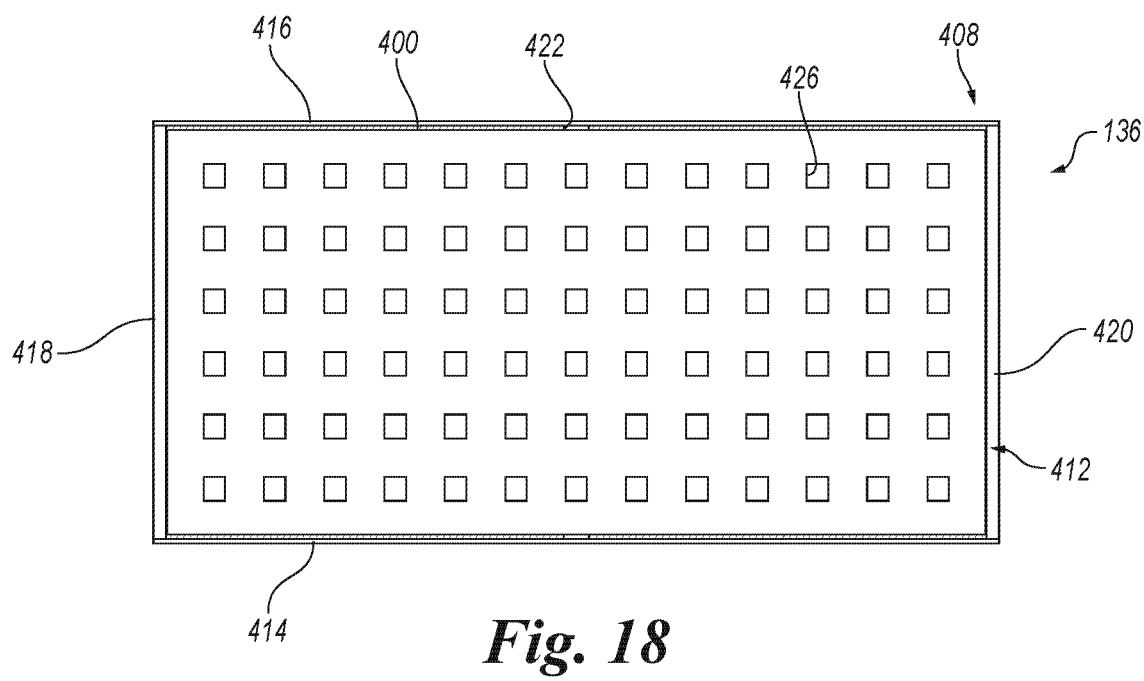
FIG. 18 is a cross-sectional bottom plan view of the wall component of the exterior enclosure of the real estate unit shown in FIG. 4 taken along the line 18-18 in FIG. 16.
Figure 19:
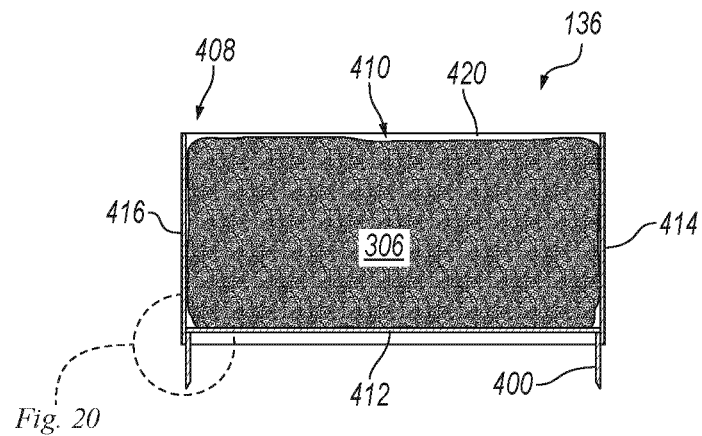
FIG. 19 is a cross-sectional end plan view of the wall component of the exterior enclosure of the real estate unit shown in FIG. 4 taken along the line 19-19 in FIG. 16.
Figure 20:
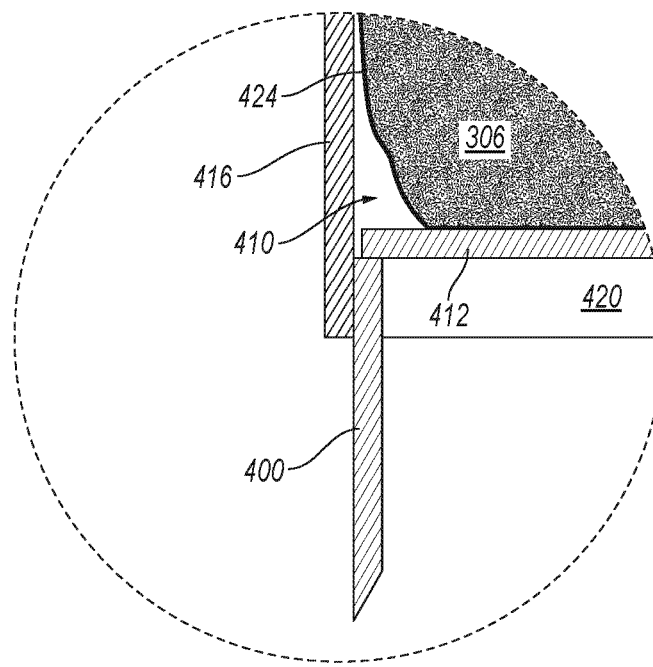
FIG. 20 is an enlarged view of a portion of FIG. 19.

FIG. 16 is side profile view of a given one of the wall components 136. FIG. 17 is a cross-sectional top plan view of the given wall component 136 taken along the line 17-17 in FIG. 16. FIG. 18 is a cross-sectional bottom plan view of the given wall component 136 taken along the line 18-18 in FIG. 16. FIG. 19 is a cross-sectional end plan view of the given wall component 136 taken along the line 19-19 in FIG. 16. FIG. 20 is an enlarged view of a portion of FIG. 19. The given wall component 136 is of the large rectangular type. In at least some embodiments, other (e.g., most or all) of the wall components 136 of the large rectangular type within the exterior enclosure 135 at least substantially match the given wall component 136. Furthermore, wall component 136 of other types (e.g., small rectangular, large L-shaped, small L-shaped, etc.) can have the same or similar features as the features of the given wall component 136. With reference to FIGS. 16-20 together, the given wall component 136 can include a rigid shell 408, a package 410 removably disposed within the shell 408, and a rigid plate 412 also removably disposed within the shell 408. The package 410 can contain the planting medium 306 in a tidy form. The plate 412 can support the package 410.

In at least some embodiments, the shell 408 is collapsible from an expanded state to a compact (e.g., at least partially flattened) state. For example, at corners where the first and second side panels 414, 416 and the first and second end panels 418, 420 meet, the given wall component 136 can include hinges (not shown), such as flexure bearings or piano hinges, that allow each corner to fold in a direction that causes the first and second side panels 414, 416 and the first and second end panels 418, 420 to at least partially flatten. This feature can facilitate efficient storage and transport of the shell 408 before and/or after its deployment at the real estate unit 126. In at least some embodiments, the plate 412 helps to hold the shell 408 in the expanded state. As shown in FIG. 20, a lowermost portion of the first side panel 414 can overlap an uppermost portion of one the flanges 400. The plate 412 can rest on upper edges of the flanges 400.

The shell 408 can include a first side panel 414 and an opposite second side panel 416 parallel to and spaced apart from the first side panel 414. Similarly, the given wall component 136 can include a first end panel 418 and an opposite second end panel 420 parallel to and spaced apart from the first end panel 418. The first and second side panels 414, 416 and the first and second end panels 418, 420 can define an interior region of the given wall component 136 shaped, for example, as a rectangular solid. The apertures 402 can extend through the shell 408 at the first and second side panels 414, 416. Alternatively, the apertures 402 can extend through the shell 408 at only the first side panel 414 or at only the second side panel 416 if the vegetation 140 is only desired at one or the other of the interior and exterior sides of the exterior enclosure 135.

The given wall component 136 can include two of the flanges 400 at the first side panel 414 and another two of the flanges 400 at the second side panel 416. As shown in FIG. 19, the flanges 400 can be parallel to and inset relative to the corresponding first and second side panels 414, 416. Between the flanges 400 at the first side panel 414 and between the flanges 400 at the second side panel 416, the given wall component 136 can include respective slots 422. When the given wall component 136 is assembled with other wall components 136 of the large rectangular type within the exterior enclosure 135, one of the flanges 400 at the first side panel 414 and an opposing one of the flanges 400 at the second side panel 416 can be received within the interior region of a first neighboring lower wall component 136. Similarly, the other of the flanges 400 at the first side panel 414 and the other of the flanges 400 at the second side panel 416 can be received within the interior region of a second neighboring lower wall component 136 adjacent to the first neighboring lower wall component 136. The second end panel 420 of the first neighboring lower wall component 136 and the first end panel 418 of the second neighboring lower wall component 136 can be directly adjacent to one another and received within the slots 422 of the given wall component 136. This interaction between the wall components 136 can facilitate convenient assembly of the exterior enclosure 135 with neighboring rows of the wall components 136 evenly staggered.

In the illustrated embodiment, the first and second side panels 414, 416 are thinner than the first and second end panels 418, 420 and made of a different material. For example, the first and second side panels 414, 416 can be metal (e.g., iron) and the first and second end panels 418, 420 can be cementitious (e.g., fiber-reinforced cement). The metal composition of the first and second side panels 414, 416 can be useful, for example, for aesthetics, to facilitate magnetic coupling of fixtures and accessories to the exterior enclosure 135, and/or for other reasons. The cementitious composition of the first and second end panels 418, 420 can be useful, for example, to reduce noise transmission through the exterior enclosure 135, for cost savings, and/or for other reasons. In other embodiments, the first and second side panels 414, 416 and the first and second end panels 418, 420 can have other suitable compositions. The package 410 can be reusable and/or compostable. Furthermore, the package 410 can be configured to remain at least substantially intact for convenient reuse and/or composting upon disassembly of the exterior enclosure 135. In at least some embodiments, the package 410 includes a biodegradable skin 424 that contains the planting medium 306. When the exterior enclosure 135 is assembled, the skin 424 can be punctured via the apertures 402. Suitable materials for the skin 424 include burlap and cotton, among others. As shown in FIG. 18, the plate 412 can include perforations 426 through which water can flow by gravity from one wall component 136 to a neighboring lower wall component 136 (or base block 304).

FIGS. 21, 22, 23 and 24 are, respectively, a first side profile view, an opposite second side profile view, a first end profile view, and an opposite second end profile view of the bathroom 127. With reference to FIGS. 21-24 together, the bathroom 127 can include a rectangular floor module 500, a rectangular ceiling module 502 vertically spaced apart from the floor module 500, and a plurality of wall modules 504 (individually identified as wall modules 504a-504d) removably connected to the floor and ceiling modules 500, 502 at respective perimeter portions of the floor and ceiling modules 500, 502. The bathroom 127 can further include a lower gasket 506 disposed between the perimeter portion of the floor module 500 and the wall modules 504, and an upper gasket 508 disposed between the perimeter portion of the ceiling module 502 and the wall modules 504. The floor module 500 can include upwardly extending tabs 510 through which the floor module 500 is secured to the wall modules 504. Similarly, the ceiling module 502 can include downwardly extending tabs 512 through which the ceiling module 502 is secured to the wall modules 504. The wall modules 504c, 504d can include vertical flanges 514 at which the wall modules 504c, 504d are secured to the wall modules 504a, 504b. The bathroom 127 can include bolts 516 and associated nuts 518 at the upwardly extending tabs 510, the downwardly extending tabs 512, and the vertical flanges 514.

At the wall module 504a (FIG. 23), the bathroom 127 can include a doorway opening 520, a frame 522 extending around the doorway opening 520, and a door 524 disposed within the doorway opening 520 and hingedly connected to the frame 522. The bathroom 127 can further include a handle 526 and hinges 528 operably associated with the door 524. At the wall module 504c (FIG. 21), the bathroom 127 can include a plumbing ventilation hookup 530 and an exhaust hookup 532. The plumbing ventilation hookup 530 and the exhaust hookup 532 can be configured for convenient connection to and disconnection from the plumbing ventilation line 188 and the exhaust line 190 (FIG. 4), respectively, such as via quick release couplings (not shown). The wall modules 504c, 504d can extend between the wall modules 504a, 504b at opposite sides of the bathroom 127. As discussed above, the bathroom 127 can be configured to be elevated above a floor surface of the interior region 114. For this purpose and/or another suitable purpose, the floor module 500 can include feet 533. In at least some embodiments, a gap between the feet 533 is large enough to allow the bathroom 127, when fully assembled, to be conveniently moved by forklift. At the ceiling module 502, the bathroom 127 can include skylights 534 that allow ambient light within the interior region 114 to enter an interior of the bathroom 127.

At a side of the floor module 500 below the wall module 504c, the bathroom 127 can include a blackwater drain hookup 535, a main cold water supply hookup 536, and a main hot water supply hookup 538. At an end of the floor module 500 below the wall module 504a, the bathroom 127 can include a main electrical hookup 540 and a main greywater drain hookup 541. The blackwater drain hookup 535, the main cold water supply hookup 536, the main hot water supply hookup 538, the main electrical hookup 540, and the main greywater drain hookup 541 can be configured for convenient connection to and disconnection from the blackwater drain line 180, the cold water supply line 182, the hot water supply line 184, the electrical line 178, and the greywater drain line 186, respectively, such as via quick release couplings (not shown). At a side of the floor module 500 below the wall module 504d, the bathroom 127 can include an auxiliary greywater drain hookup 542, an auxiliary cold water supply hookup 544, an auxiliary hot water supply hookup 546, and an auxiliary electrical hookup 548. The auxiliary greywater drain hookup 542, the auxiliary cold water supply hookup 544, the auxiliary hot water supply hookup 546, and the auxiliary electrical hookup 548 can be configured for convenient connection to and disconnection from corresponding lines (not shown) of the kitchenette 250, such as via quick release couplings (not shown).

Figure 21:
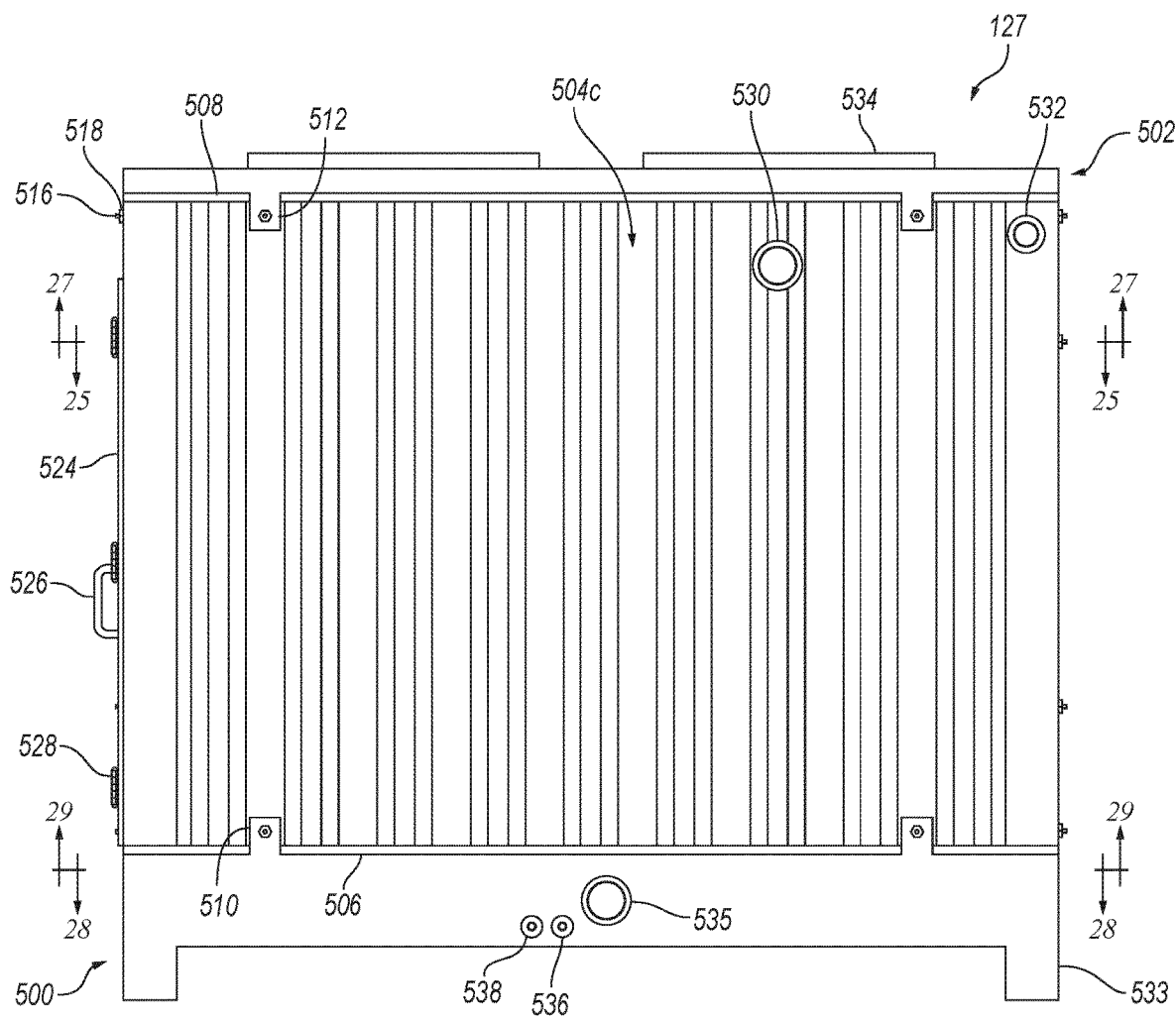
Figure 22:
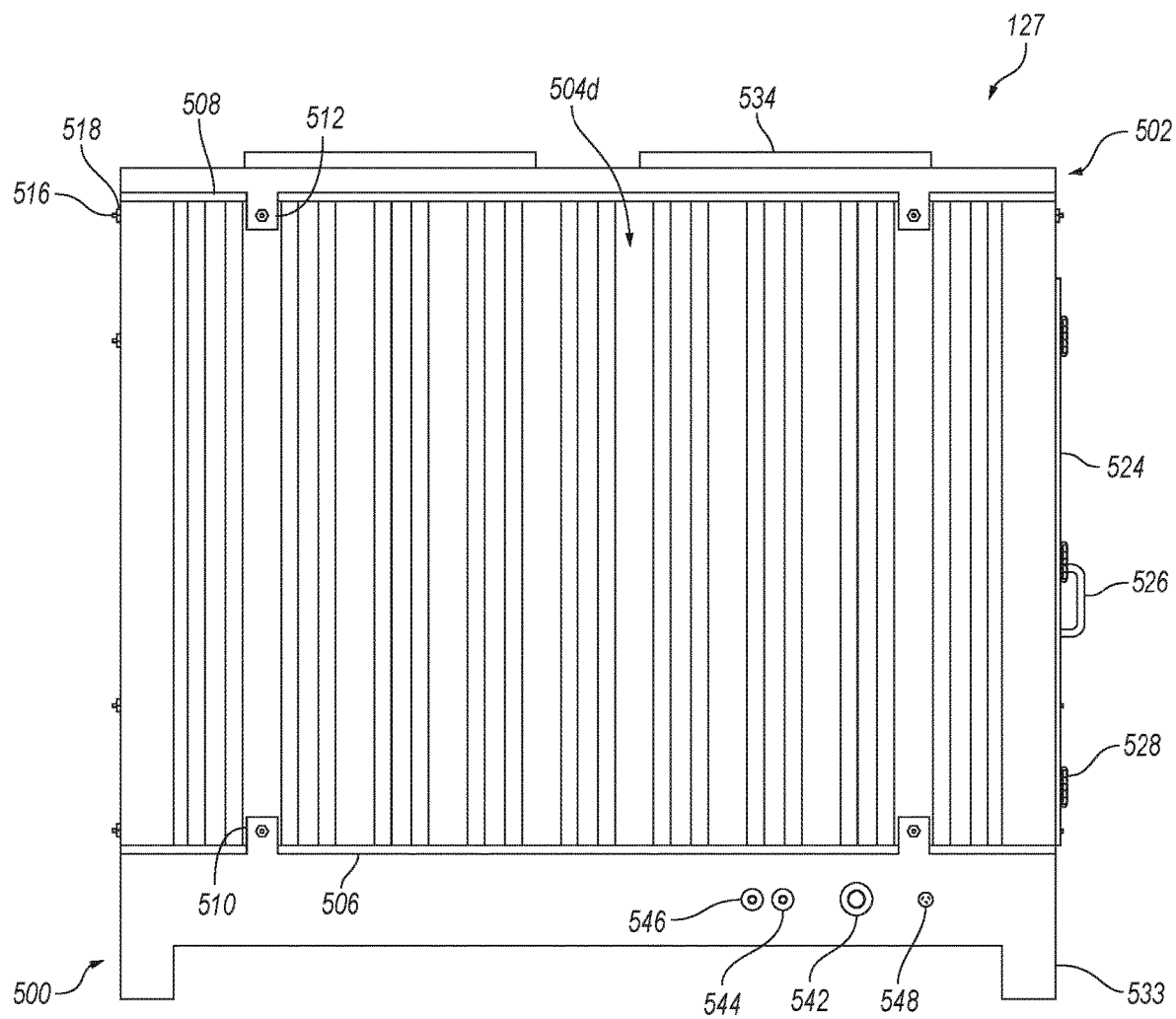
Figure 25:
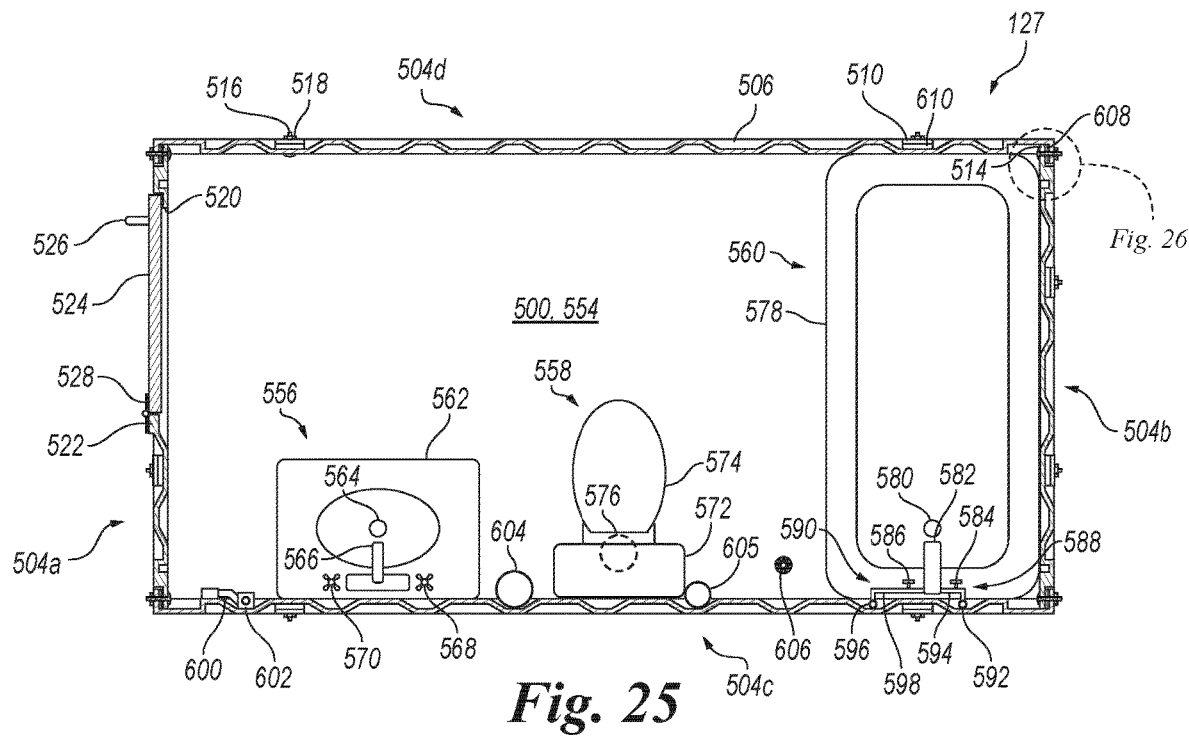
FIG. 25 is a cross-sectional top plan view of the bathroom of the real estate unit shown in FIG. 4 taken along the line 25-25 in FIG. 21.

FIG. 25 is a cross-sectional top plan view of the bathroom 127 taken along the line 25-25 in FIG. 21. As shown in FIG. 25, the floor module 500 can include a deck 554, and the bathroom 127 can include a sink 556, a toilet 558, and a bathtub/shower 560 disposed (e.g., removably disposed) on the deck 554. The sink 556 can include a basin 562, a sink drain 564, a sink faucet 566, a sink hot water knob 568, and a sink cold water knob 570 operably connected to one another. The toilet 558 can include a tank 572, a bowl 574, and a toilet drain 576 operably connected to one another. The bathtub/shower 560 can include a tub 578, a bathtub/shower drain 580, a tub faucet 582, a tub cold water knob 584, a tub hot water knob 586, a cold water conduit 588, and a hot water conduit 590 operably connected to one another. The cold water conduit 588 can include a riser 592 and a first branch 594 extending between the riser 592 and the tub faucet 582. The tub cold water knob 584 can be disposed along the first branch 594 and operable to control a flow of cold water from the cold water conduit 588 to the tub faucet 582. Similarly, the hot water conduit 590 can include a riser 596 and a first branch 598 extending between the riser 596 and the tub faucet 582. The tub hot water knob 586 can be disposed along the first branch 598 and operable to control a flow of hot water from the hot water conduit 590 to the tub faucet 582.

Figure 26:
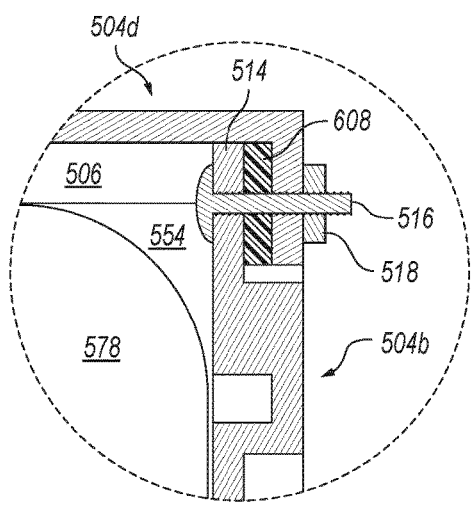
FIG. 26 is an enlarged view of a portion of FIG. 25.

The bathroom 127 can include an electrical conduit 600, and a junction box 602 operably connected to the electrical conduit 600. The bathroom 127 can further include a first plumbing ventilation conduit 604 disposed between the sink 556 and the toilet 558, and a second plumbing ventilation conduit 605 disposed between the sink 556 and the bathtub/shower 560. The first and second plumbing ventilation conduits 604, 605 can be configured to ventilate blackwater and greywater plumbing, respectively. The bathroom 127 can still further include a floor drain 606 disposed between the toilet 558 and the bathtub/shower 560. FIG. 26 is an enlarged view of a portion of FIG. 25. With reference to FIGS. 25 and 26 together, the bathroom 127 can include vertical gaskets 608 disposed between the respective vertical flanges 514 and corresponding portions of the wall modules 504a, 504b. Similarly, the bathroom 127 can include lower tab gaskets 610 disposed between the respective upwardly extending tabs 510 and corresponding portions of the wall modules 504.

Figure 27:
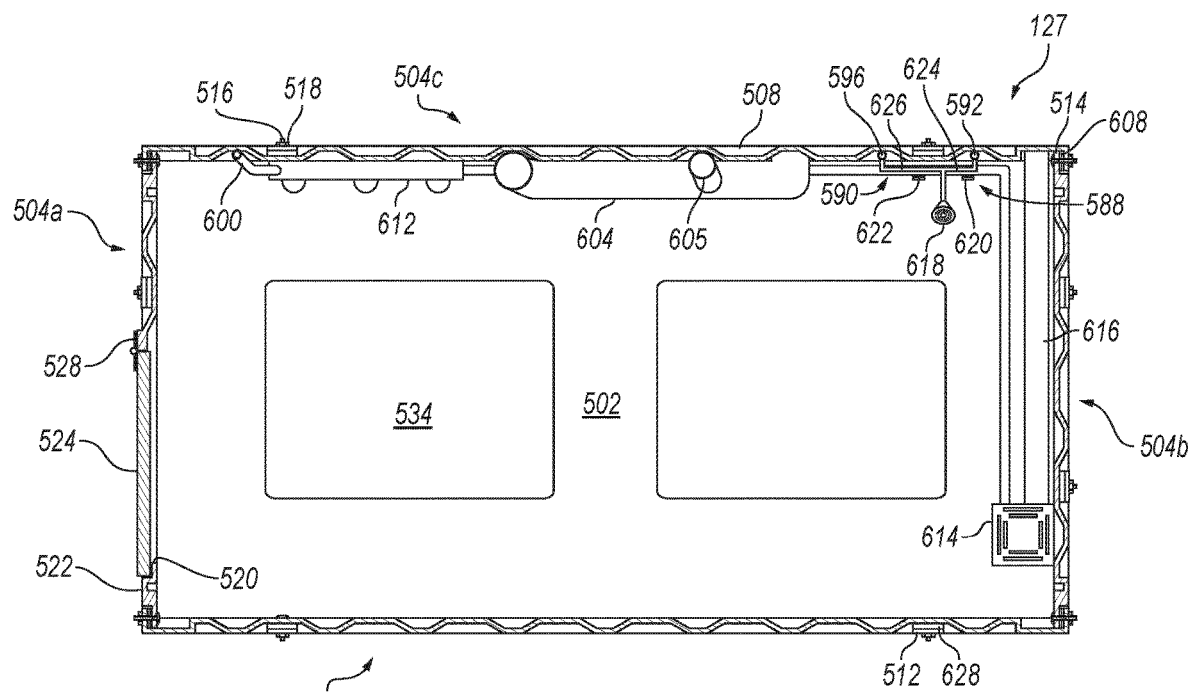
FIG. 27 is a cross-sectional bottom plan view of the bathroom of the real estate unit shown in FIG. 4 taken along the line 27-27 in FIG. 21.

FIG. 27 is a cross-sectional bottom plan view of the bathroom 127 taken along the line 27-27 in FIG. 21. As shown in FIG. 27, the bathroom 127 can include a light fixture 612 attached to the wall module 504c above the sink 556. The bathroom 127 can further include an exhaust intake fan 614 attached to the ceiling module 502. The electrical conduit 600 can extend from the junction box 602 (FIG. 25) to the light fixture 612, and from the light fixture 612 to the exhaust intake fan 614. The first and second plumbing ventilation conduits 604, 605 can merge and extend along an inner corner between the ceiling module 502 and the wall module 504c to the plumbing ventilation hookup 530 (FIG. 21). The bathroom 127 can include an exhaust conduit 616 extending from the exhaust intake fan 614 along an inner corner between the ceiling module 502 and the wall module 504b to the exhaust hookup 532 (FIG. 21). Above one end of the tub 578 (FIG. 25), the bathtub/shower 560 (FIG. 25) can include a showerhead 618, a shower cold water knob 620 operably connected to the cold water conduit 588, and a shower hot water knob 622 operably connected to the hot water conduit 590. The cold water conduit 588 can include a second branch 624 extending between the riser 592 and the showerhead 618. The shower cold water knob 620 can be disposed along the second branch 624 and operable to control a flow of cold water from the cold water conduit 588 to the showerhead 618. Similarly, the hot water conduit 590 can include a second branch 626 extending between the riser 596 and the showerhead 618. The shower hot water knob 622 can be disposed along the second branch 626 and operable to control a flow of hot water from the hot water conduit 590 to the showerhead 618. The bathroom 127 can include upper tab gaskets 628 disposed between the respective downwardly extending tabs 512 and corresponding portions of the wall modules 504.

Figure 28:
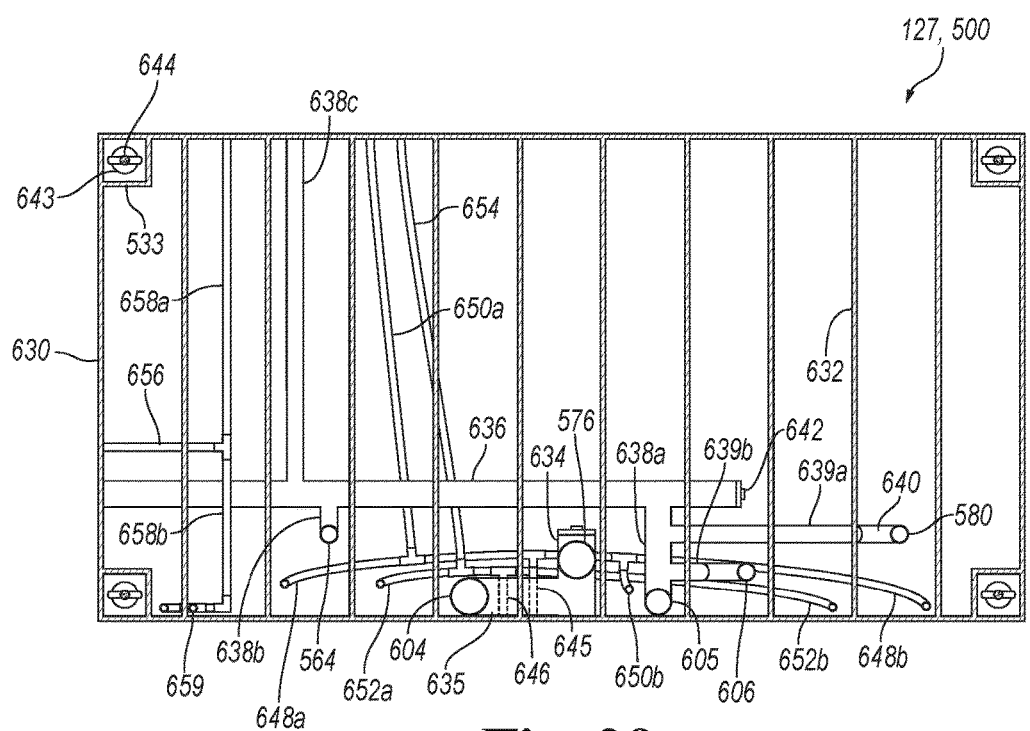
FIG. 28 is a cross-sectional top plan view of the bathroom of the real estate unit shown in FIG. 4 taken along the line 28-28 in FIG. 21.

FIG. 28 is a cross-sectional top plan view of the bathroom 127 taken along the line 28-28 in FIG. 21. With reference to FIGS. 4 and 21-28 together, the floor module 500 can include a skirt 630 and a series of parallel spaced-apart joists 632 within the skirt 630. The bathroom 127 can include a blackwater drain conduit 634 operably connected to the blackwater drain hookup 535 and the toilet drain 576. Thus, the toilet 558 can be operably connected to the blackwater tank 148 via the blackwater drain conduit 634 and the blackwater drain line 180. The blackwater drain conduit 634 can include a branch 635 operably connected to the first plumbing ventilation conduit 604. The bathroom 127 can further include a greywater drain conduit 636 operably connected to the main greywater drain hookup 541. The greywater drain conduit 636 can include branches 638 (individually identified as branches 638a-638c) operably connected to the second plumbing ventilation conduit 605, the sink drain 564, and the auxiliary greywater drain hookup 542, respectively. The greywater drain conduit 636 can further include sub-branches 639 (individually identified as sub-branches 639a, 639b) operably connected to the bathtub/shower drain 580 and the floor drain 606, respectively. Thus, the bathtub/shower drain 580 can be operably connected to the greywater filter 154 via the greywater drain conduit 636 and the greywater drain line 186. The sub-branches 639c, 639b of the greywater drain conduit 636 can include respective traps 640. Furthermore, the blackwater drain conduit 634 and the greywater drain conduit 636 can include respective caps 642, such as to facilitate clean-out.

The bathroom 127 can include wheels 643 (e.g., swivel casters) integrated into the floor module 500. In the illustrated embodiment, the wheels 643 are embedded within the feet 533 and accessible via inwardly facing openings (not shown) of the feet 533. The individual wheels 643 can be movable between a retracted state and an extended state. For example, the bathroom 127 can include posts 644 having threads (not shown) that engage corresponding threads (not shown) of the wheels 643 such that the wheels 643 can be rotatably moved between the retracted and extended states. Moving the wheels 643 from the retracted state to the extended state can lift the bathroom 127 off a corresponding floor surface, thereby allowing the bathroom 127 to be conveniently moved along the floor surface.

The bathroom 127 can further include a main cold water conduit 645 and a main hot water conduit 646 operably connected to the main cold water supply hookup 536 and the main hot water supply hookup 538, respectively. The main cold water conduit 645 can include branches 648 (individually identified as branches 648a, 648b) operably connected to the sink 556 and the bathtub/shower 560 (via the riser 592), respectively. The main cold water conduit 645 can further include sub-branches 650 (individually identified as sub-branches 650a, 650b) operably connected to the auxiliary cold water supply hookup 544 and the toilet 558, respectively. The main hot water conduit 646 can include branches 652 (individually identified as branches 652a, 652b) operably connected to the sink 556 and the bathtub/shower 560 (via the riser 596), respectively. The main hot water conduit 646 can further include a sub-branch 654 operably connected to the auxiliary hot water supply hookup 546. The bathroom 127 can still further include a main electrical conduit 656 operably connected to the main electrical hookup 540. The main electrical conduit 656 can include branches 658 (individually identified as branches 658a, 658b) operably connected to the auxiliary electrical hookup 548 and a floor heating system (introduced below). The main electrical conduit 656 can further include a sub-branch 659 operably connected to the electrical conduit 600.

Figure 29:
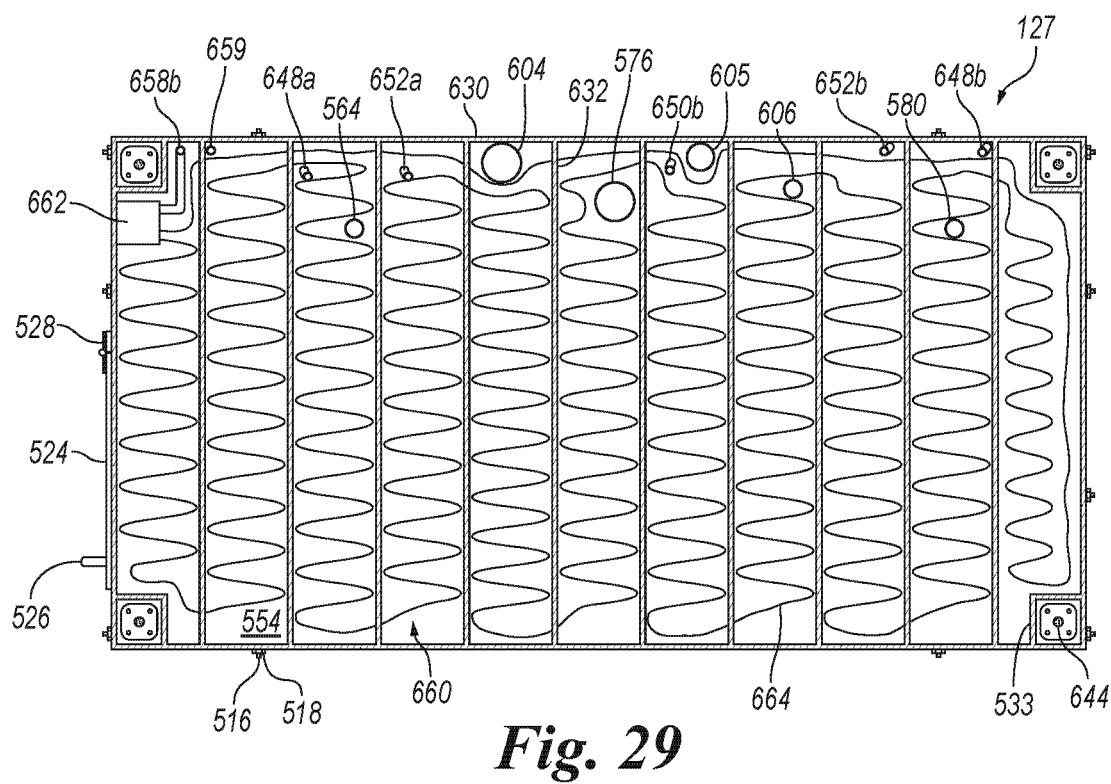
FIG. 29 is a cross-sectional bottom plan view of the bathroom of the real estate unit shown in FIG. 4 taken along the line 29-29 in FIG. 21.

FIG. 29 is a cross-sectional bottom plan view of the bathroom 127 taken along the line 29-29 in FIG. 21. As shown in FIG. 29, the bathroom 127 can include a floor heating system 660 operably associated with the deck 554. The floor heating system 660 can include a control box 662 operably connected to the branch 658b of the main electrical conduit 656, and a heating cable 664 operably connected to the control box 662. The heating cable 664 can have a serpentine configuration and be directly connected to an underside of the deck 554 between the joists 632. With reference to FIGS. 21-29 together, the floor drain 606, the blackwater drain conduit 634 (e.g., including its branch 635), the greywater drain conduit 636 (e.g., including its branches 638 and sub-branches 639), the main cold water conduit 645 (e.g., including its branches 648 and sub-branches 650), the main hot water conduit 646 (e.g., including its branches 652 and sub-branch 654), the main electrical conduit 656 (e.g., including its branches 658 and sub-branch 659), the floor heating system 660, and/or other suitable components of the bathroom 127 can be pre-installed components of the floor module 500. Similarly, the supply plumbing for the bathtub/shower 560 (e.g., including the tub faucet 582, the cold water conduit 588, the hot water conduit 590, and the showerhead 618), the light fixture 612, and/or other suitable components of the bathroom 127 can be pre-installed components of the wall module 504c. These and/or other aspects of the bathroom 127 can facilitate rapid deployment, removal, and redeployment of the bathroom 127.

Figure 30:
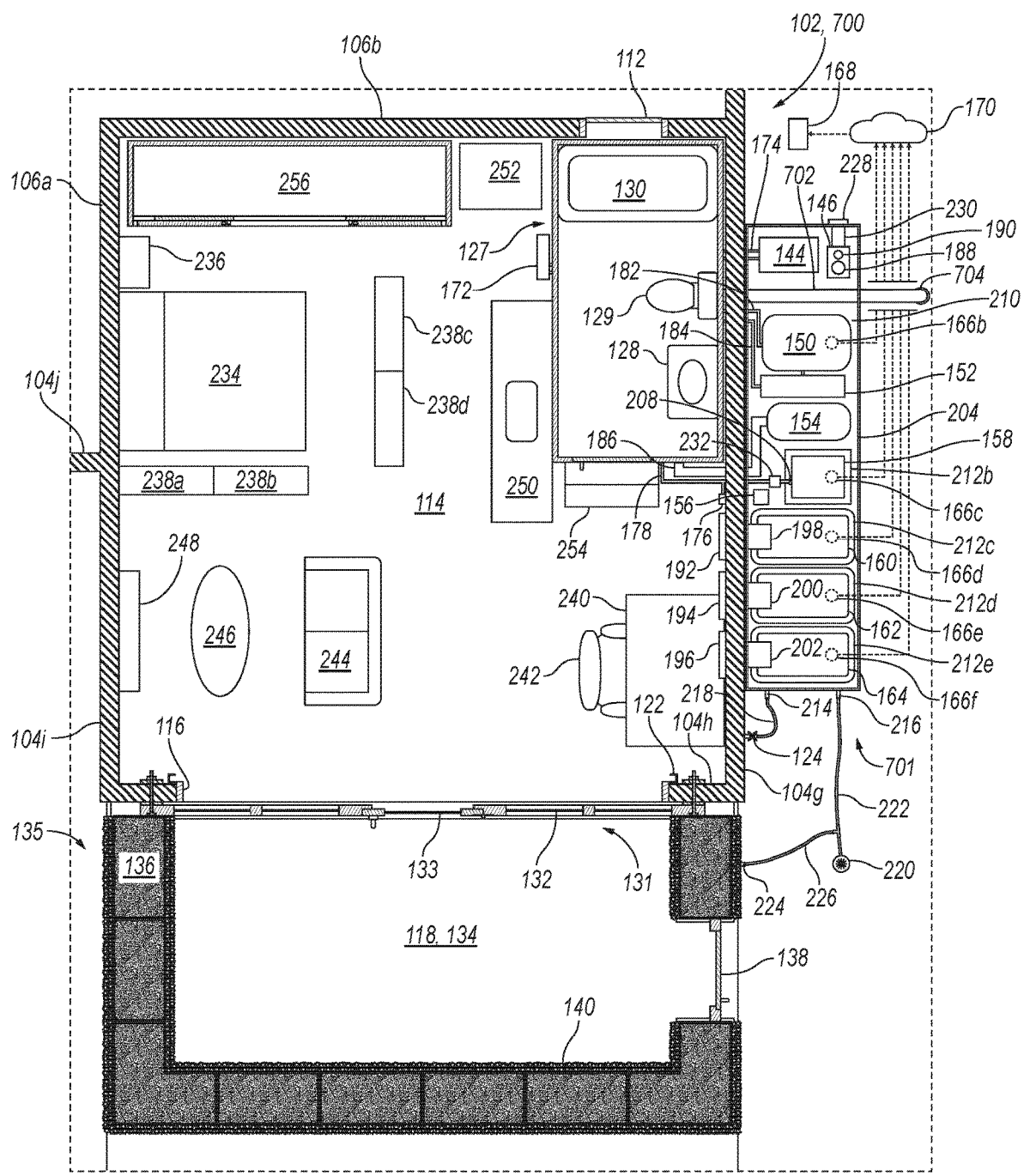
FIG. 30 is a cross-sectional top plan view corresponding to the portion of FIG. 2 shown in FIG. 3 and showing a real estate unit in accordance with another embodiment of the present technology including the interior region of the garage of the single-family house shown in FIG. 1 with the garage in the second state.

FIG. 30 is a cross-sectional top plan view corresponding to the portion of FIG. 2 shown in FIG. 3 and showing a real estate unit 700 in accordance with another embodiment of the present technology including the interior region 114 in the second state. The real estate unit 700 can include a dock 701 that does not include the blackwater tank 148 (FIG. 4) and the blackwater drain line 180 (FIG. 4) of the real estate unit 126 (FIG. 4). Instead of these components, the real estate unit 700 can include a blackwater drain line 702 extending between the bathroom 127 and an outdoor sewage hookup 704. The blackwater drain line 702 can extend through the exterior wall 104g from the bathroom 127 toward the sewage hookup 704. Furthermore, the blackwater drain line 702 can extend above-floor and then aboveground from the bathroom 127 toward the sewage hookup 704.

The sewage hookup 702 can be a retrofitted access point to a municipal, septic, or other permanent sewage system serving the house 100 (FIG. 1). In at least some cases, the blackwater drain line 180 connects to the sewage hookup 702 via a quick-connect coupling (not shown). In the illustrated embodiment, the real estate unit 700 (like the real estate unit 126 (FIG. 4)) is configured to recycle greywater. In other embodiments, a counterpart of the real estate unit 700 can be configured to dispose of greywater with blackwater via the sewage hookup 702. For example, a counterpart of the bathroom 127 can be alternatively configured so that a counterpart of the greywater drain conduit 636 (FIG.

28) is combined with a counterpart of the blackwater drain conduit 634 (FIG. 28). In these and other embodiments, the exterior enclosure 135 can be configured to receive water from the hose bibb 124 and/or configured to receive water in another suitable manner.

In another embodiment, a counterpart of the real estate unit 126 (FIG. 4) is operably associated with components that reduce or eliminate the need for frequent servicing and/or connections to permanent utilities serving the house 100 (FIG. 1). For example, the counterpart of the real estate unit 126 (FIG. 4) can be operably associated with a high-capacity sewage detention reservoir (not shown) disposed (e.g., removably disposed) outside the interior region 114, a high-capacity cold water reservoir (not shown) disposed (e.g., removably disposed) outside the interior region 114, and/or a high-capacity generator (not shown) disposed (e.g., removably disposed) outside the interior region 114. The high-capacity sewage detention reservoir can be configured for occasional evacuation into a mobile tanker (e.g., a septic system pump truck). Similarly, the high-capacity cold water reservoir can be configured for occasional replenishment from a mobile tanker (e.g., a water supply truck). In these embodiments, with reference to FIG. 4, a counterpart of the dock 142 can be without the blackwater tank 148, the water reservoir 150, the greywater filter 154, and/or the battery 158.

Figure 31:
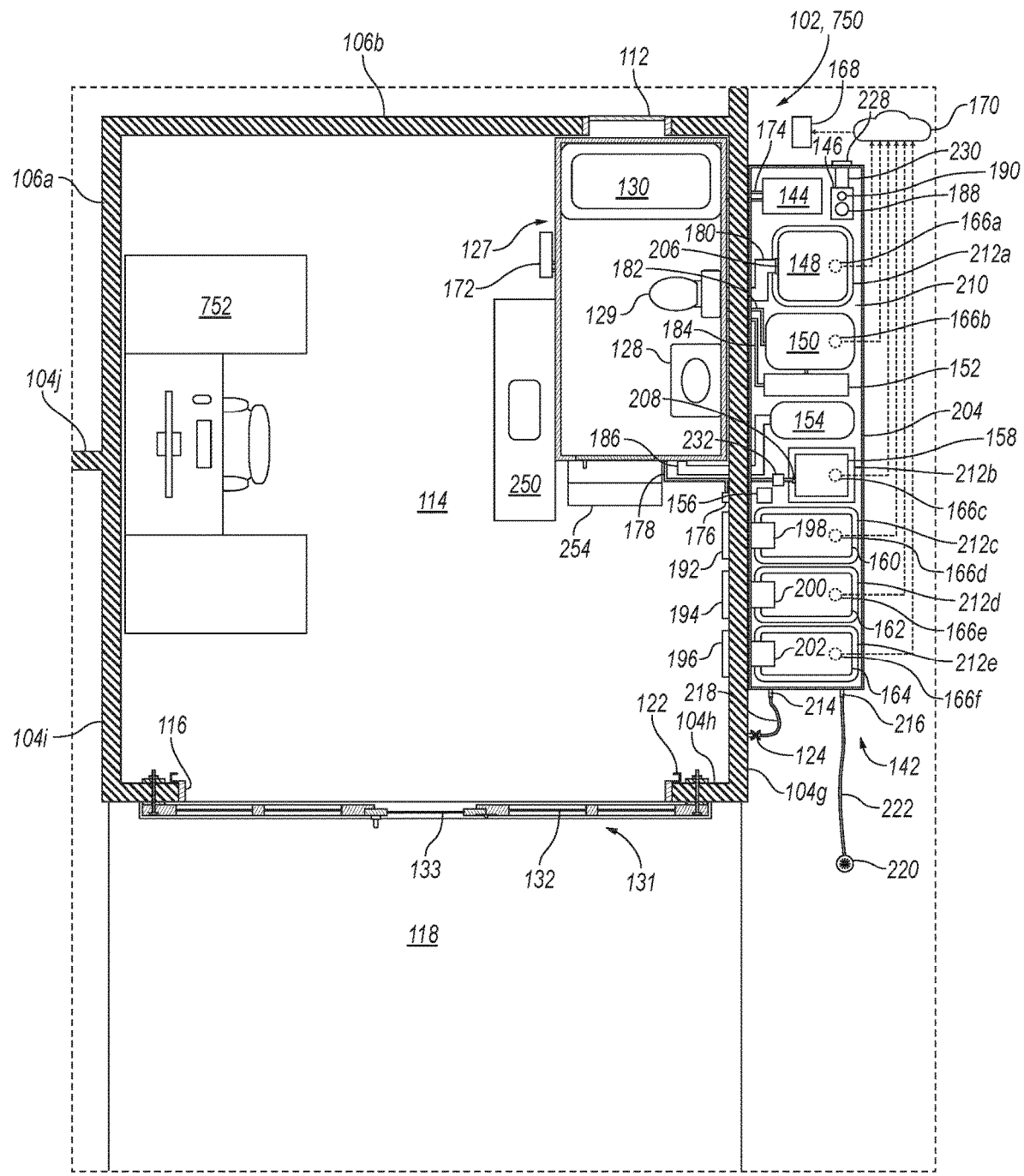
FIG. 31 is a cross-sectional top plan view corresponding to the portion of FIG. 2 shown in FIG. 3 and showing a real estate unit in accordance with another embodiment of the present technology including the interior region of the garage of the single-family house shown in FIG. 1 with the garage in the second state.

In the embodiments illustrated in FIGS. 4 and 30, the real estate units 126, 700 are configured at least primarily as lodging and/or residential units. In other embodiments, a counterpart of the real estate units 126, 700 can have another suitable primary use. For example, the counterpart of the real estate units 126, 700 can be a rentable office unit, a rentable assembly unit, and/or a rentable unit of another suitable type. For example, FIG. 31 is a cross-sectional top plan view corresponding to the portion of FIG. 2 shown in FIG. 3 and showing a real estate unit 750 in accordance with another embodiment of the present technology including the interior region 114 in the second state. The real estate unit 750 can be configured at least primarily as a rentable office unit. The real estate unit 750 can include office furnishings, such as a workstation 752 removably disposed within the interior region 114. Because privacy tends to be less important for office uses than for lodging and residential uses and/or for other reasons, the real estate unit 750 can be without the exterior enclosure 135 (FIG. 4). Alternatively, a counterpart of the real estate unit 750 can include the exterior enclosure 135 (FIG. 4) or a comparable structure.

Figure 32:
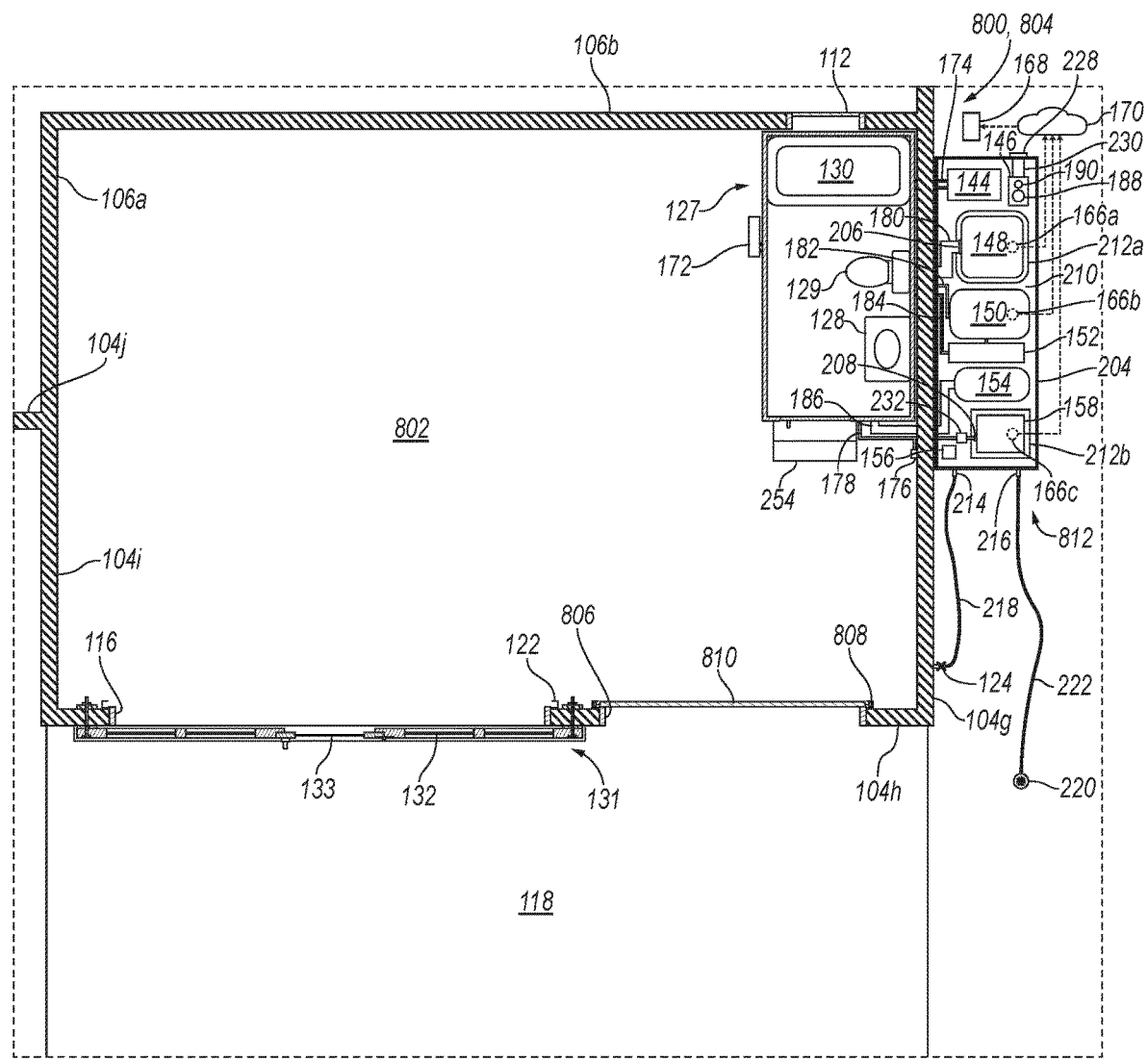
FIG. 32 is a cross-sectional top plan view of a real estate unit in accordance with another embodiment of the present technology including an interior region of a three-car garage in the second state.

FIG. 32 is a cross-sectional top plan view of a real estate unit 800 in accordance with another embodiment of the present technology including an interior region 802 of a three-car garage 804 in the second state. The garage 804 can include a secondary opening 806 between the interior region 114 and the outdoor area 118. Like the opening 116, the secondary opening 806 can be sized to permit passage of a car between the interior region 114 and the outdoor area 118. For example, the secondary opening 806 can have a width within a range from 2 meters to 4 meters. The garage 804 can further include a secondary door track 808 at the secondary opening 806 and a secondary overhead door 810 operably connected to the secondary door track 808. In the illustrated embodiment, rather than being stowed in an open state, the secondary overhead door 810 is stowed in a closed state when the garage 804 is in the retrofitted state. In other embodiments, the secondary overhead door 810 can be stowed in an open state or removed and a counterpart of the real estate unit 800 can include a secondary barrier operably associated with the secondary opening 806. The secondary barrier can have some or all of the features discussed above for the barrier 131. In still other embodiments, the secondary overhead door 810 can remain active (i.e., configured for frequent operation) in the real estate unit 800 rather than being stowed. In still other embodiments, a counterpart of the barrier 131 can overlie both the opening 116 and the secondary opening 806.

With reference again to FIG. 32, the real estate unit 800 can be configured at least primarily as a rentable assembly unit. For example, the real estate unit 800 can be configured to accommodate parties, classes, etc. Like the real estate unit 750 (FIG. 31), the real estate unit 800 can be without the exterior enclosure 135 (FIG. 4). Alternatively, a counterpart of the real estate unit 800 can include the exterior enclosure 135 (FIG. 4) or a comparable structure. The real estate unit 800 can include a dock 812 that does not include the trash bin 160 (FIG. 4), the recycling bin 162 (FIG. 4), and the laundry bin 164 (FIG. 4) of the real estate unit 126 (FIG. 4), but is otherwise the same as or similar to the dock 142 (FIG. 4).

Figure 33:
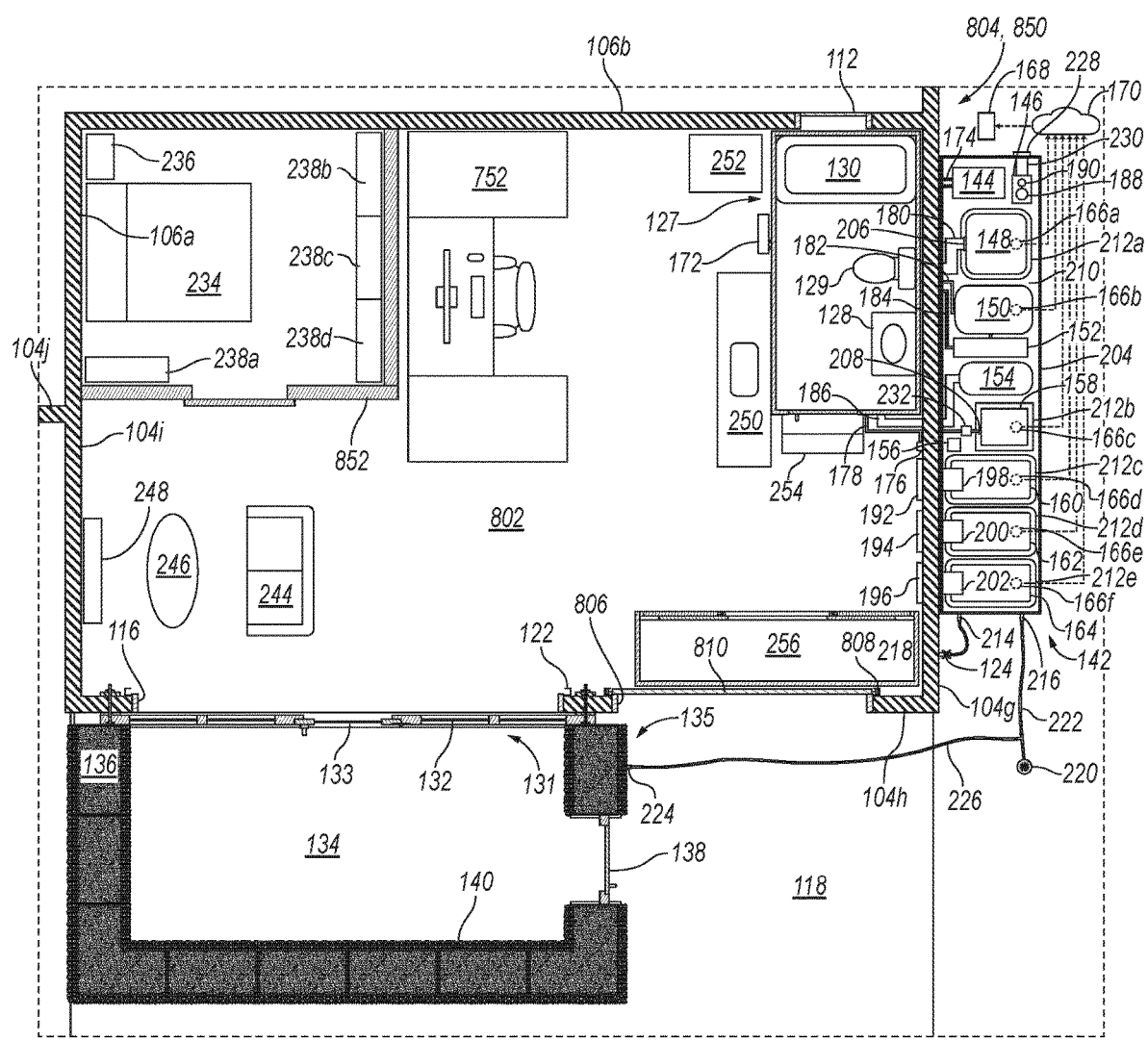
FIG. 33 is a cross-sectional top plan view of a real estate unit in accordance with another embodiment of the present technology including the interior region of the three-car garage in the second state.

FIG. 33 is a cross-sectional top plan view of a real estate unit 850 in accordance with yet another embodiment of the present technology including the interior region 802 in the second state. The real estate unit 850 can be configured at least primarily as a combined lodging and rentable office unit. For example, the real estate unit 850 can include both a workstation 752 and a bed 234. In the illustrated embodiment, the real estate unit 850 further includes partitions 852 that close off the bed 234 during work hours. The partitions 852 can be reusable and removably disposed within the interior region 802 of the garage 804. In other embodiments, the partitions 852 can be omitted and the portion of the interior region 802 including the bed 234 can be open to other portions of the interior region 802. In still other embodiments, the bed 802 can be replaced with a sofa bed, a wall bed, or another type of convertible bed that readily transitions between a compact and/or hidden state when not in use and an expanded and/or exposed state when in use.

Figure 34:
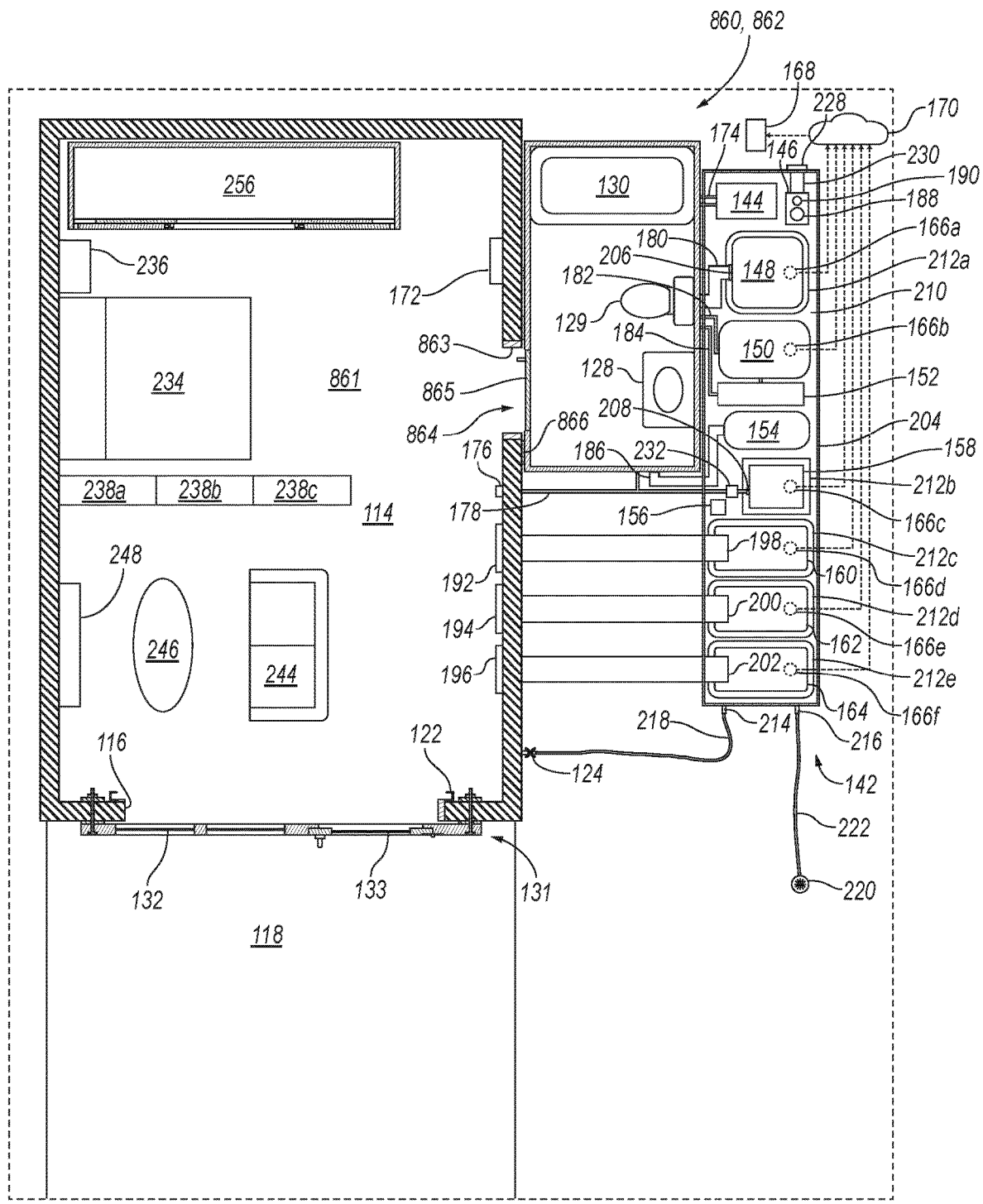
FIG. 34 is a cross-sectional top plan view of a real estate unit in accordance with another embodiment of the present technology including an interior region of a detached one-car garage in the second state.

FIG. 34 is a cross-sectional top plan view of a real estate unit 860 in accordance with another embodiment of the present technology including an interior region 861 of a detached one-car garage 862 in the second state. The garage 862 can include a side doorway 863 with a removed door. The real estate unit 860 can include a reusable bathroom 864 disposed (e.g., removably disposed) outside the interior region 861. The bathroom 864 can be similar to the bathroom 127 (FIGS. 21-29) and can include a door 865 aligned with the side doorway 863. Similar to the barrier 131 (FIG. 5), the bathroom 864 can include a gasket 866 disposed between a wall of the bathroom 864 and an exterior wall of the garage 862. The gasket 866 can be compressible such that it conforms to irregularities in the corresponding exterior wall of the garage 862 and thereby enhances a weather resistance of a connection between the bathroom 864 and the exterior wall of the garage 862. The bathroom 864 can further include bolts or clamps (not shown) that secure the connection between the bathroom 864 and the exterior wall of the garage 862.

Figure 35:
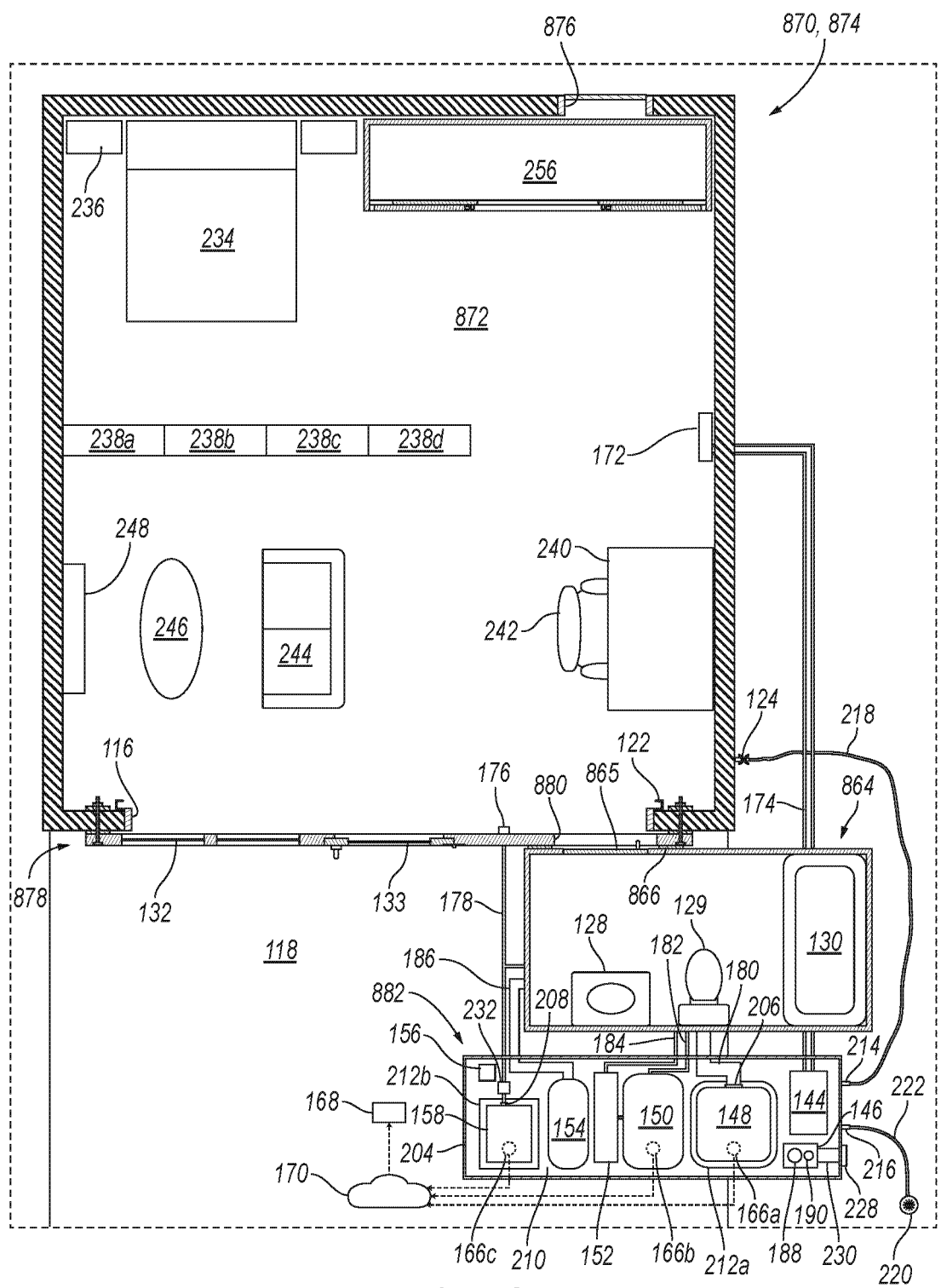
FIG. 35 is a cross-sectional top plan view of a real estate unit in accordance with another embodiment of the present technology including an interior region of a detached two-car garage in the second state.

FIG. 35 is a cross-sectional top plan view of a real estate unit 870 in accordance with another embodiment of the present technology including an interior region 872 of a detached two-car garage 874 in the second state. The garage 874 can include a rear doorway 876 that is not in service. For example the rear doorway 876 can be blocked by the closet 256 of the real estate unit 870. As with the real estate unit 860 (FIG. 34), the bathroom 864 of the real estate unit 870 can be disposed (e.g., removably disposed) outside the interior region 872. The real estate unit 870 can include a barrier 878 disposed (e.g., removably disposed) between the interior region 872 and the outdoor area 118 adjacent to the garage 874. The barrier 878 can be configured to permit ingress to and egress from the interior region 872. The barrier 878 can also be configured to permit access to the bathroom 864 of the real estate unit 870 from the interior region 872. For example, the barrier 878 can include an opening 880 aligned with the door 865 of the bathroom 864. The real estate unit 870 can also include a dock 882 similar to the dock 812 described above with reference to FIG. 32.

Figure 36:
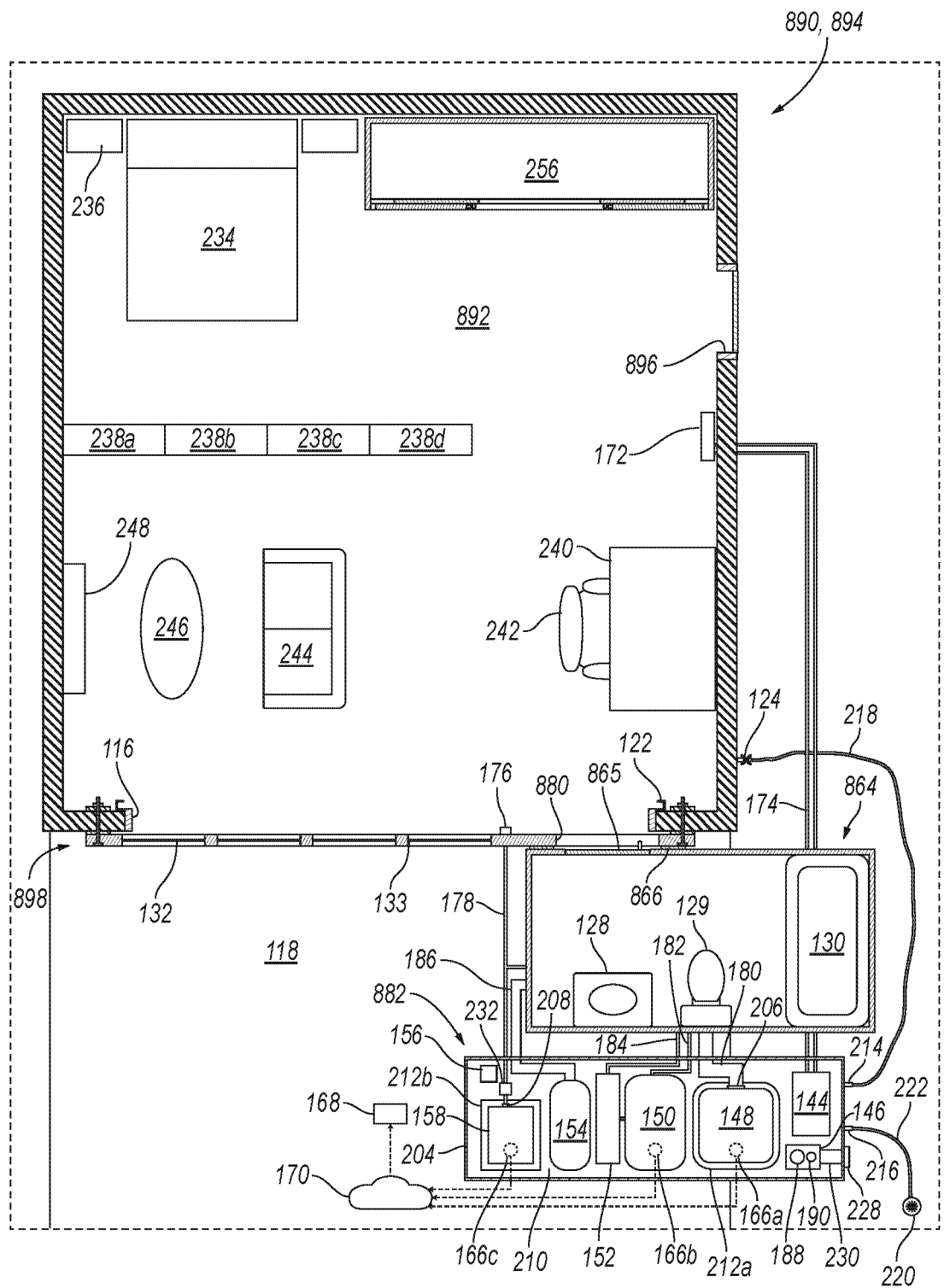
FIG. 36 is a cross-sectional top plan view of a real estate unit in accordance with another embodiment of the present technology including an interior region of a detached two-car garage in the second state.

FIG. 36 is a cross-sectional top plan view of a real estate unit 890 in accordance with yet another embodiment of the present technology including an interior region 892 of a detached two-car garage 894 in the second state. The garage 894 can include a side doorway 896 that is in service for providing ingress to and egress from the interior region 892. Again, the bathroom 864 of the real estate unit 890 can be disposed (e.g., removably disposed) outside the interior region 892. The real estate unit 890 can include a barrier 898 disposed (e.g., removably disposed) between the interior region 892 and the outdoor area 118 adjacent to the garage 894. The barrier 898 can be similar to the barrier 878 (FIG. 35) although without a doorway to permit ingress to and egress from the interior region 892. Rather, as mentioned above, ingress to and egress from the interior region 892 can be via the side doorway 896.

FIG. 37 is a block diagram illustrating a method 900 for retrofitting a given garage to form at least a portion of a given real estate unit in accordance with an embodiment of the present technology. For simplicity, the method 900 will be further described primarily in the context of the real estate unit 126 and the garage 102. It should be understood, however, that the method 900, when suitable, and/or portions of the method 900, when suitable, can be practiced with respect to any of the real estate units 126, 700, 750, 800, 850, 860, 870, 890 and with respect to any of the garages 102, 804, 862, 874, 894 described above with reference to FIGS. 4-36 as well as with respect to other real estate units and garages in accordance with embodiments of the present technology. With reference to FIGS. 4-29 and 37 together, the method 900 can include leasing the interior region 114 (block 902) or establishing control of the interior region 114 in another suitable manner. For example, the interior region 114 can be leased from an owner of the garage 102 (e.g., an owner of the house 100) for provision of lodging, residential space, office space, and/or assembly space, and/or another type of space to third parties.

In at least some embodiments, the method 900 includes at least substantially reversibly retrofitting the garage 102 to accommodate a non-garage use (e.g., a lodging use, a residential use, an office use, and/or an assembly use) at the interior region 114. In these and other embodiments, it may be economically feasible to lease the interior region 114 and retrofit the garage 102 with little or no long-term commitment from an owner of the garage 102. This can be due to the reusability of a significant amount of the capital associated with retrofitting the garage 102 and/or for other reasons. Accordingly, in some embodiments, the interior region 114 is leased month-to-month. In other embodiments, the interior region 114 can be leased under terms that allow the owner of the garage 102 to terminate the lease with notice of less than one month. In still other embodiments, the interior region 114 can be controlled by an operator of the real estate unit 126 under other lease arrangements, under non-lease contractual arrangements (e.g., franchising), or under fee simple ownership. After direct or indirect control over the interior region 114 is established, the method 900 can include subleasing (or leasing if the garage 102 is owned in fee simple) the interior region 114 to a renter. When the interior region 114 is leased separately from other portions of the house 100, an owner of the house 100 can occupy or otherwise use the other portions of the house 100 while the interior region 114 is leased to third parties. When the interior region 114 is leased together with other portions of the house 100, an operator of the real estate unit 126 can separately lease the interior region 114 as the real estate unit 126 and some or all of the other portions of the house 100 as another real estate unit.

The method 900 can further include transporting modules (e.g., the bathroom 127, the barrier 131, the wall components 136, and/or the dock 142) to the garage 102 (block 904). Some or all of the modules can be transported in a compact state. For example, the bathroom 127 can be transported in its disassembled state, the barrier 131 can be transported in its folded state, the wall components 136 can be transported in their disassembled states, and/or the shells 408 can be transported in their collapsed states. The method 900 can further include receiving the modules at the garage 102 (block 906). For example, the bathroom 127, the barrier 131, the wall components 136, the dock 142, and/or other suitable components of the real estate unit 126 can be received at the garage 102 in an at least substantially pre-manufactured state.

After the bathroom 127 is received at the garage 102, the method 900 can include installing the bathroom 127 (block 908), such as by disposing (e.g., removably disposing) the bathroom 127 within or outside the interior region 114. In at least some embodiments, installing the bathroom 127 includes assembling (e.g., at least substantially reversibly assembling) a set of reusable bathroom modules (e.g., the floor module 500, the ceiling module 502, and the wall modules 504) to form an assembly of reusable bathroom modules. For example, the method 900 can include disposing (e.g., removably disposing) the floor module 500 at a suitable location within or outside the interior region 114, and connecting (e.g., removably connecting) the wall modules 504 to the floor module 500 at a perimeter portion of the floor module 500. The bathroom 127 can be disposed within the interior region 114 such that the floor level of the bathroom 127 is at least 0.5 meter higher than the underlying floor level of the interior region 114. The method 900 can further include installing (e.g., removably installing) furnishings within the interior region 114. For example, when the garage 102 is retrofitted for lodging and/or residential use at the interior region 114, the method 900 can include disposing (e.g., removably disposing) lodging and/or residential furnishings within the interior region 114. As another example, when the garage 102 is retrofitted for office use at the interior region 114, the method 900 can include disposing (e.g., removably disposing) office furnishings within the interior region 114.

The method 900 can also include installing the barrier 131 (block 912). For example, the method 900 can include disposing (e.g., removably and stationarily disposing) the barrier 131 between the interior region 114 and the outdoor area 118. The barrier 131 can be installed such that a path permitting a renter of the real estate unit 126 to move between the interior region 114 and the outdoor area 118 extends through the opening 116 and through the barrier 131. Installing the barrier 131 can include installing the barrier 131 in an unfolded state. In addition or alternatively, installing the barrier 131 can include at least substantially reversibly assembling a set of barrier modules to form an assembly of barrier modules. In at least some embodiments, installing the barrier 131 includes fastening (e.g., removably fastening) the barrier 131 to the exterior wall 104*h*. For example, the barrier 131 can be bolted, screwed, and/or clamped to the exterior wall 104*h*. Installing the barrier 131 can further include forming the first mass of self-leveling material 300, such as integrally along most or all of an overall footprint of the barrier 131. The barrier 131 can then be installed over the first mass of self-leveling material 300. In some embodiments, installing the barrier 131 includes inserting the barrier 131 into the opening 116. In other embodiments, installing the barrier 131 includes overlaying the barrier 131 over the opening 116. For example, installing the barrier 131 can include compressing the gasket 354 between the frame 352 and the exterior wall 104*h*. In conjunction with installing the barrier 131 or separately, the method 900 can include stowing the overhead door 120 within the interior region 114 in its open state (block 914). In at least some cases, this includes disabling (e.g., reversibly disabling) a control for the overhead door 120.

As shown in FIG. 37, the method 900 can include installing the dock 142 (block 916). For example, the method 900 can include disposing (e.g., removably disposing) the dock 142 outside the interior region 114. In conjunction with installing the dock 142 or separately, the method 900 can include disposing (e.g., removably disposing) the water reservoir 150, the battery 158, the blackwater tank 148, and/or other suitable modules outside the interior region 114. These modules can be connected (e.g., removably connected) to the dock 142 and/or to other suitable components of the real estate unit 126. For example, the water reservoir 150 and the bathroom 127 can be operably connected via the cold water supply line 182; the toilet 558 and the blackwater tank 148 can be operably connected via the blackwater drain line 180; and the bathtub/shower drain 580 and the greywater filter 154 can be operably connected via the greywater drain line 186. In addition or alternatively, the bathroom 127 and the sewage hookup 704 can be operably connected via the blackwater drain line 702. When the bathroom 127 is operably connected to the blackwater tank 148, establishing this connection can include operating the blackwater drain quick-connect coupling 206 to fluidically connect the bathroom 127 and the blackwater tank 148. Similarly, the electrical quick-connect coupling 208 can be operated to electrically connect the battery 158 and the bathroom 127. In at least some embodiments, the garage 102 is retrofitted for off-grid operation with respect to an electrical supply to the interior region 114 and/or retrofitted for off-grid operation with respect to disposal of blackwater from the toilet 558.

Operably connecting the bathroom 127 and the blackwater tank 148 can include extending the blackwater drain line 180 between the bathroom 127 and the blackwater tank 148 such that the blackwater drain line 180 extends above-floor and then above-ground from the bathroom 127 toward the blackwater tank 148. Similarly, operably connecting the bathroom 127 and the sewage hookup 704 can include extending the blackwater drain line 702 between the bathroom 127 and the sewage hookup 704 such that the blackwater drain line 702 extends above-floor and then above-ground from the bathroom 127 toward the sewage hookup 704. In at least some embodiments, installing the dock 142 further includes connecting (e.g., removably connecting) the water reservoir 150 and the hose bibb 124.

The method 900 can further include installing the exterior enclosure 135 (block 918). In at least some cases, this is part of retrofitting the outdoor area 118 from being a driveway and/or parking area to being the courtyard 134. Installing the exterior enclosure 135 can include forming the second mass of self-leveling material 302, such as integrally along most or all of an overall footprint of the exterior enclosure 135. The wall components 136 can then be disposed (e.g., removably disposed) over the second mass of self-leveling material 302. The second mass of self-leveling material 302 can be formed and the wall components 136 can be disposed at the perimeter portion of the outdoor area 118 to form at least a portion of the exterior enclosure 135. Disposing the wall components 136 can include stacking and/or interlocking the wall components 136. This can be done, for example, while the shells 408 are in an expanded state. Installing the exterior enclosure 135 can further include differentially planting the apertures 402 to form the brand identifier 404. For example, this can be done using a template after all or most of the wall components 136 of the exterior enclosure 135 have been installed.

FIG. 38 is a block diagram illustrating a method 950 for operating a given real estate unit in accordance with an embodiment of the present technology. As with the method 900, the method 950 will be further described primarily in the context of the real estate unit 126 and the garage 102. It should be understood, however, that the method 950, when suitable, and/or portions of the method 950, when suitable, can be practiced with respect to any of the real estate units 126, 700, 750, 800, 850, 860, 870, 890 and with respect to any of the garages 102, 804, 862, 874, 894 described above with reference to FIGS. 4-33 as well as with respect to other real estate units and garages in accordance with embodiments of the present technology. With reference to FIGS. 4-29 and 38 together, the method 950 can be practiced in connection with providing lodging, rentable residential space, rentable office space, rentable assembly space, and/or another suitable type of space at the interior region 114. The method 950 can include leasing the interior region 114 (block 952) or maintaining control of the interior region 114 in another suitable manner, such as one of the manners described above in connection with establishing control of the interior region 114 in the method 900.

The method 950 can further include providing renter access to the interior region 114 (block 954), such as through the opening 116 and through the barrier 131. In this way, the method 950 can include providing access to furnishings at the interior region 114 corresponding to the use type. For example, the method 950 can include providing renter access to lodging and/or residential furnishings (e.g., the bed 234) within the interior region 114 when the real estate unit 126 is operated as a lodging and/or residential unit. As another example, the method 950 can include providing renter access to office furnishings (e.g., the workstation 752) within the interior region 114 when the real estate unit 126 is operated as an office unit. Providing renter access to the interior region 114 can occur by leasing the interior region 114 to the renter, subleasing the interior region 114 to the renter, providing renter access to the interior region 114 through a membership agreement, providing renter access to the interior region 114 through a short-term use arrangement (e.g., a lodging arrangement), and/or providing renter access to the interior region 114 in another suitable manner. The method 950 can further include providing renter access to the bathroom 127 (block 956) and providing renter access to the courtyard 134 (block 958).

As shown in FIG. 38, the method 950 can include flowing sewage from the bathroom 127 (block 960). For example, the method 950 can include flowing backwater from the toilet 129 toward the blackwater tank 148 via the blackwater drain line 180. As another example, the method 950 can include flowing sewage (e.g., blackwater) from the bathroom 127 toward the sewage hookup 704 via the blackwater drain line 702. As yet another example, the method 950 can include flowing greywater from the bathtub/shower drain 580 toward the greywater filter 154. The method 950 can also include swapping the blackwater tank 148 with a less full counterpart of the blackwater tank 148 to remove sewage from the real estate unit 126 (block 962). This can include operating the blackwater drain quick-connect coupling 206 to disconnect the blackwater tank 148 from fluidic connection with the bathroom 127 and removing the blackwater tank 148 from the dock 142. Swapping the blackwater tank 148 can be at least partially in response to receiving an indication of a fullness of the blackwater tank 148 from the sensor 166a. In at least some embodiments, the method 950 includes operating the real estate unit 126 off-grid with respect to remote disposal of blackwater from the toilet 129.

The method 950 can further include flowing water toward the bathroom 127 (block 964). For example, the method 950 can include flowing water from the water reservoir 150 toward the bathroom 127 via the cold water supply line 182. Furthermore, the method 950 can include flowing water from the hose bibb 124 toward the water reservoir 150 to replenish the water reservoir 150. The method 950 can also include providing electricity to the interior region 114 (block 966). For example, the method 950 can include powering an appliance within the interior region 114 using the battery 158 via the electrical outlet 176. The method 950 can further include swapping the battery 158 with a less depleted counterpart of the battery 158 to replenish an electrical supply to the real estate unit 126. This can include operating the electrical quick-connect coupling 208 to disconnect the battery 158 from electrical connection with the electrical outlet 176. Swapping the battery 158 can be at least partially in response to receiving an indication of a depleted state of the battery 158 from the sensor 166c. In at least some embodiments, the method 950 includes operating the real estate unit 126 off-grid with respect to an electrical supply to the interior region 114.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments can also exhibit such advantages, and not all embodiments need necessarily exhibit such advantages or other advantages disclosed herein to fall within the scope of the present technology. This disclosure and the associated technology can encompass other embodiments not expressly shown or described herein.

As a person having ordinary skill in the art will recognize, numerous permutations of the features disclosed herein are within the scope of the present technology. For example, the real estate units 126, 700, 750 can be implemented at the garage 804 instead of the garage 102. As another example, the real estate units 800, 850 can be implemented at the garage 102 instead of the garage 804. As yet another example, the bathroom 127 can be tethered for waste disposal and/or water supply to a permanent bathroom (not shown) of the house 100 in a manner similar to the manner disclosed in U.S. Patent Application No. 62/222,750, which is incorporated herein by reference in its entirety. As yet another example, an exterior enclosure 135 can be added to the real estate units 750, 800, 860, 870 and 890.

Although features of the present technology are described herein primarily in the context of garages, it should be understood that the same or similar features can be implemented in other suitable contexts. For example, when suitable, a storage space can be substituted for either of the garages 102, 804 in the discussions of the real estate units 126, 700, 750, 800, 850, 860, 870, 890 herein. Potentially suitable storage spaces include, among other examples, drive-up storage units typically used for storage of personal belongings. Retrofitting these and other types of storage spaces for alternative uses in accordance with embodiments of the present technology can include combining multiple individual storage units to form a single real estate unit. As another example, when suitable, a commercial loading space (e.g., a loading dock) can be substituted for either of the garages 102, 804 in the discussions of the real estate units 126, 700, 750, 800, 850, 860, 870, 890 herein. Retrofitting commercial loading spaces for alternative uses in accordance with embodiments of the present technology can include compartmentalizing the loading spaces using reusable wall components. This concept and other concepts relevant to retrofitting commercial loading spaces are discussed in U.S. Patent Application No. 62/154,209, which is incorporated herein by reference in its entirety.

Certain aspects of the present technology may take the form of computer-executable instructions, including routines executed by a controller or other data processor. In some embodiments, a controller or other data processor is specifically programmed, configured, or constructed to perform one or more of these computer-executable instructions. Furthermore, some aspects of the present technology may take the form of data (e.g., non-transitory data) stored or distributed on computer-readable media, including magnetic or optically readable or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

The methods disclosed herein include and encompass, in addition to methods of practicing the present technology (e.g., methods of making and operating physical embodiments of the present technology), methods of instructing others to practice the present technology. For example, a method in accordance with a particular embodiment includes providing renter access to an interior region of a retrofitted garage and providing renter access to a reusable bathroom removably disposed within the interior region. A method in accordance with another embodiment includes instructing such a method.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising," "including," and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various structures. It should be understood that such terms do not denote absolute orientation. Furthermore, reference herein to "one embodiment," "an embodiment," or similar phrases means that a particular feature, structure, operation, or characteristic described in connection with such phrases can be included in at least one embodiment of the present technology. Thus, such phrases as used herein are not necessarily all referring to the same embodiment. Finally, it should be noted that various particular features, structures, operations, and characteristics of the embodiments described herein may be combined in any suitable manner in additional embodiments in accordance with the present technology.

I claim:

1. A real estate unit, comprising:
   an interior region of a retrofitted garage, wherein the retrofitted garage includes a wall between the interior region and an outdoor area, and wherein the wall includes an opening having a width within a range from 2 meters to 7 meters;
   a reusable bathroom removably installed at the outdoor area and in operable association with the interior region, wherein the reusable bathroom is portable or an assembly of reusable bathroom modules; and
   a fenestrated barrier disposed between the interior region and the outdoor area, wherein a path permitting a user of the real estate unit to move between the interior region and the outdoor area extends through the opening and through the fenestrated barrier.

2. The real estate unit of claim 1, further comprising a plumbing drain line extending above-ground between the reusable bathroom and an outdoor sewage hookup.

3. The real estate unit of claim 1 wherein:
   the retrofitted garage is retrofitted for lodging and/or residential use at the interior region;
   the real estate unit further comprises lodging and/or residential furnishings within the interior region; and
   the lodging and/or residential furnishings include a bed.

4. The real estate unit of claim 1 wherein:
   the retrofitted garage includes a hose bibb; and
   the reusable bathroom is configured to receive water via the hose bibb.

5. The real estate unit of claim 1 wherein the retrofitted garage is a retrofitted attached garage of a single-family house.

6. The real estate unit of claim 1 wherein the reusable bathroom is adjacent to the fenestrated barrier.

7. The real estate unit of claim 1 wherein the fenestrated barrier is portable or an assembly of reusable modules.

8. The real estate unit of claim 1 wherein the fenestrated barrier is an insert.

9. The real estate unit of claim 1 wherein the fenestrated barrier is an overlay.

10. The real estate unit of claim 1 wherein the fenestrated barrier includes a frame and a compressible gasket disposed between the frame and the wall.

11. The real estate unit of claim 1 wherein:
    the retrofitted garage includes
    a door track at the opening, and
    an overhead door operably connected to the door track; and
    the overhead door is stowed within the interior region in an open state.

12. The real estate unit of claim 1 wherein:
    the retrofitted garage includes a door track at the opening; and
    the fenestrated barrier is operably connected to the door track.

13. The real estate unit of claim 1 wherein the fenestrated barrier is removably fastened to the wall.

14. The real estate unit of claim 1 wherein the fenestrated barrier is removably clamped to the wall.

15. The real estate unit of claim 1 wherein the fenestrated barrier is removably bolted to the wall.

16. The real estate unit of claim 1 wherein:
    the path is a first path; and
    a second path permitting a user of the real estate unit to move between the interior region and the reusable bathroom extends through the opening and through the fenestrated barrier.

17. The real estate unit of claim 16 wherein:
    the fenestrated barrier includes a second opening; and
    the reusable bathroom includes a door aligned with the second opening.

18. The real estate unit of claim 1 wherein:
    the real estate unit further comprises a courtyard at the outdoor area; and
    the outdoor area is a former driveway and/or parking area retrofitted for courtyard use.

19. The real estate unit of claim 18, further comprising an exterior enclosure including reusable wall components removably disposed at a perimeter portion of the courtyard.

* * * * *